United States Patent
Nisenzon

(10) Patent No.: US 11,635,767 B2
(45) Date of Patent: Apr. 25, 2023

(54) SYSTEM AND METHOD OF USING MULTI-RESOLUTION CAMERA CLUSTERS INPUT DATA FOR CONTROLLING AUTONOMOUS VEHICLES

(71) Applicant: Semyon Nisenzon, Palo Alto, CA (US)

(72) Inventor: Semyon Nisenzon, Palo Alto, CA (US)

(73) Assignee: Semyon Nisenzon, Palo Alto, CA (US)

(*) Notice: Subject to any disclaimer, the term of this patent is extended or adjusted under 35 U.S.C. 154(b) by 322 days.

(21) Appl. No.: 16/788,324

(22) Filed: Feb. 12, 2020

(65) Prior Publication Data

US 2020/0257306 A1 Aug. 13, 2020

Related U.S. Application Data

(60) Provisional application No. 62/804,771, filed on Feb. 13, 2019.

(51) Int. Cl.
*G05D 1/02* (2020.01)

(52) U.S. Cl.
CPC ......... *G05D 1/0251* (2013.01); *G05D 1/0223* (2013.01); *G05D 1/0274* (2013.01); *G05D 2201/0213* (2013.01)

(58) Field of Classification Search
CPC .. G05D 1/0251; G05D 1/0223; G05D 1/0274; G05D 2201/0213
See application file for complete search history.

(56) References Cited

U.S. PATENT DOCUMENTS

| 10,916,035 B1* | 2/2021 | Kroeger | G05D 1/0212 |
| 2017/0318280 A1* | 11/2017 | Nisenzon | H04N 13/25 |

FOREIGN PATENT DOCUMENTS

| WO | WO-2012077457 A1 * | 6/2012 | C03B 33/0235 |
| WO | WO-2014010251 A  * | 1/2014 | G01B 11/002 |
| WO | WO-2014152681 A2 * | 9/2014 | G01J 5/025 |
| WO | WO-2018032457 A1 * | 2/2018 | B64C 39/024 |

OTHER PUBLICATIONS

English Translation of WO-2012077457-A1.*

* cited by examiner

*Primary Examiner* — Remi Khatib
*Assistant Examiner* — Shahira Baajour
(74) *Attorney, Agent, or Firm* — Prakash Nama; Global IP Services, PLLC

(57) ABSTRACT

In one example, a method may include capturing two-dimensional (2D) images of scenes using a set of multi-resolution cameras disposed on at least one side of an autonomous vehicle. Further, a low-resolution depth map with relatively small depths may be generated for each scene using the captured 2D images. Furthermore, a high-resolution depth map may be generated for each scene for a wide depth range by iteratively refining the low-resolution depth map for each scene. Also, a 3D video may be generated based on the high-resolution depth maps and the captured 2D images of the central camera. Further, a distance, a velocity, and/or an acceleration of one or more objects relative to the autonomous vehicle is computed by analyzing one or more frames of the 3D video. Then, the autonomous vehicle may be controlled based on the computed distance, velocity, and/or acceleration of the one or more objects.

34 Claims, 12 Drawing Sheets

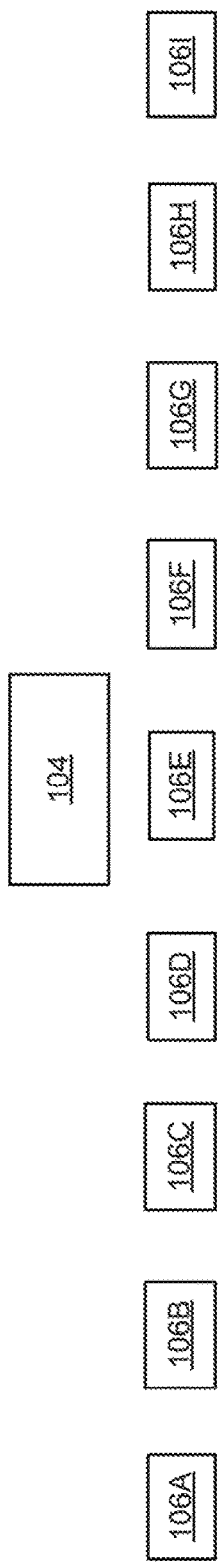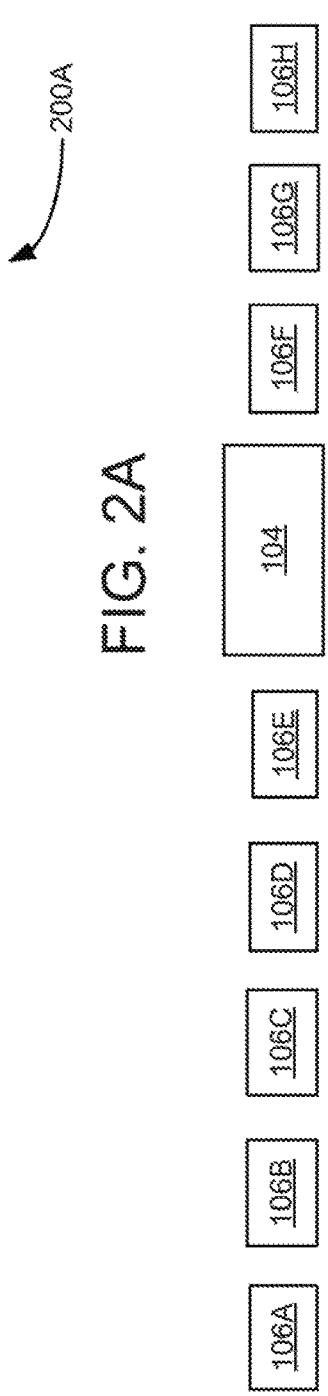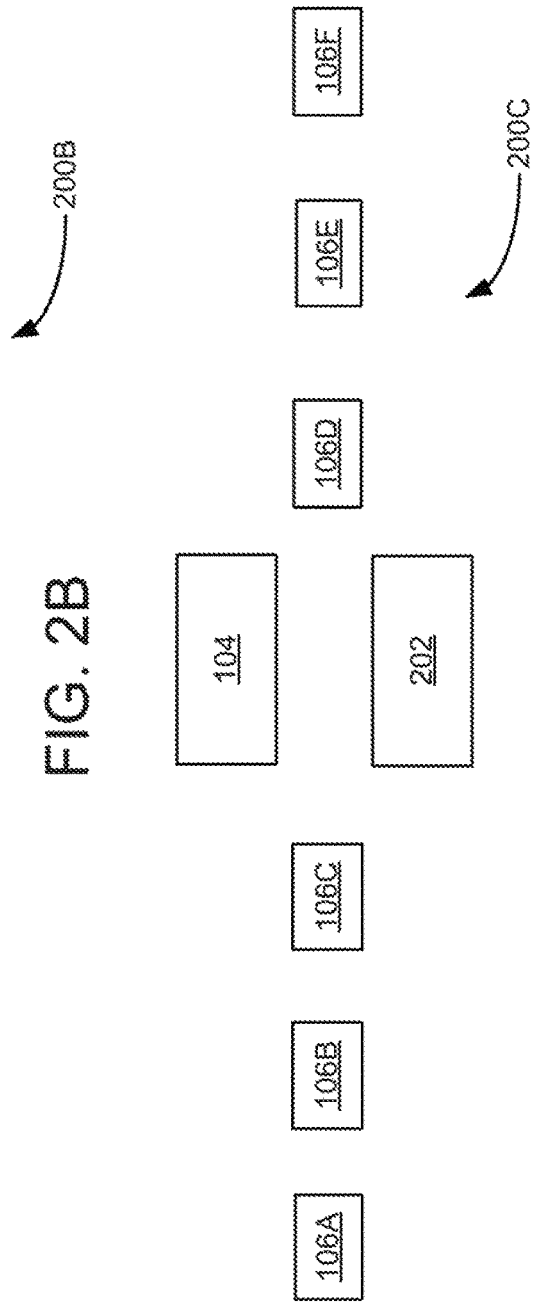

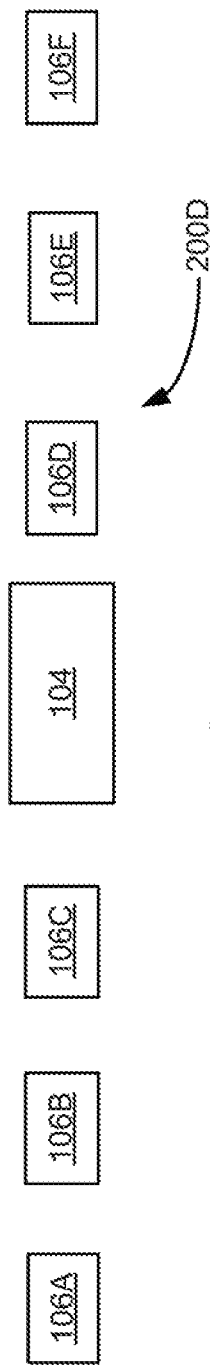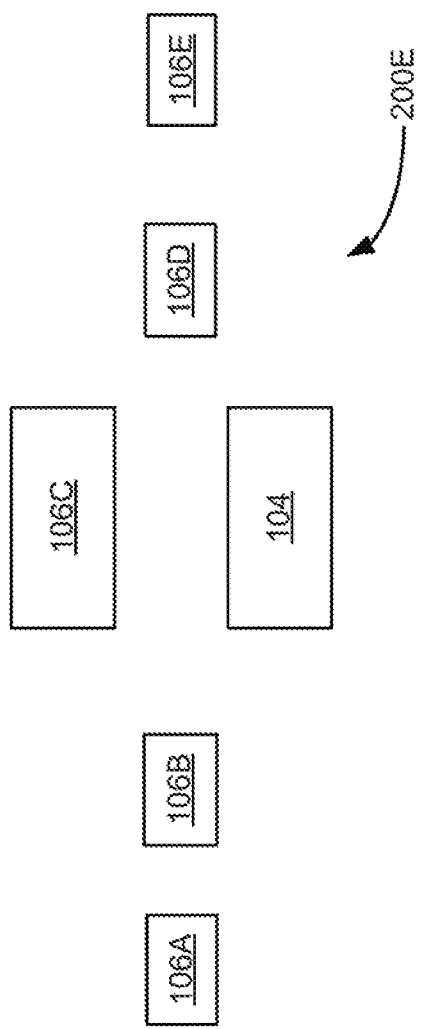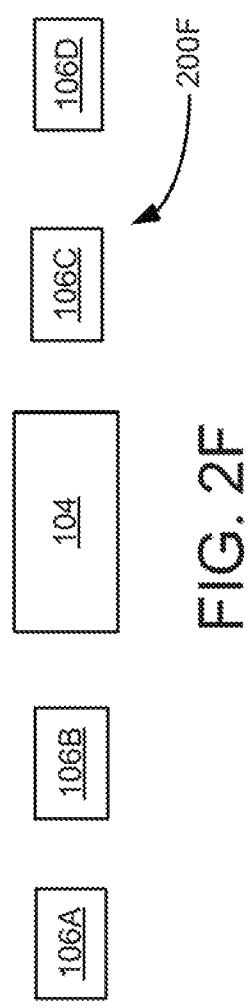

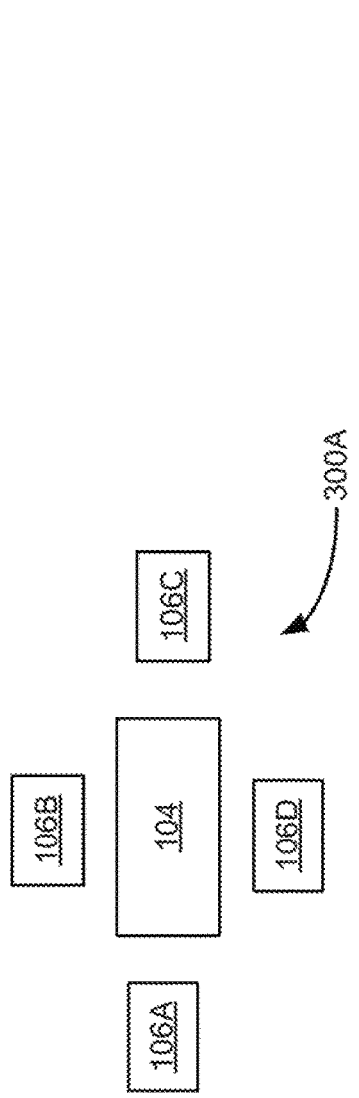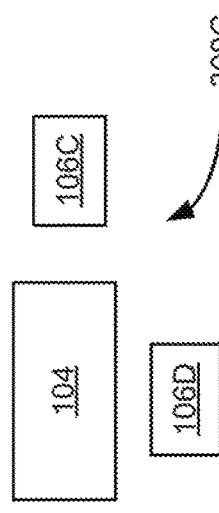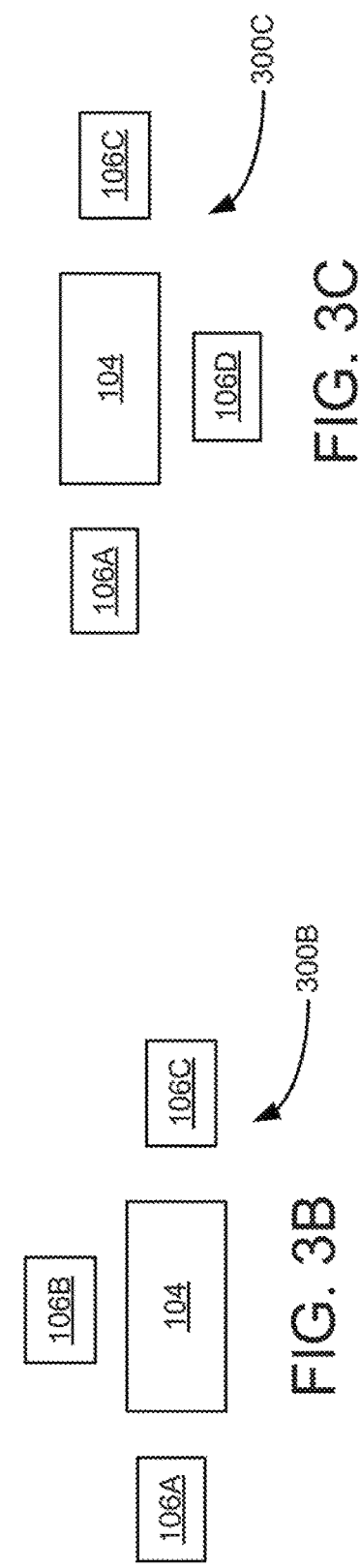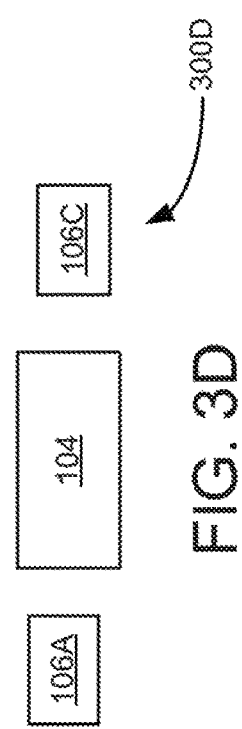

SYSTEM AND METHOD OF USING MULTI-RESOLUTION CAMERA CLUSTERS INPUT DATA FOR CONTROLLING AUTONOMOUS VEHICLES

BACKGROUND

Vehicles, such as autonomous and semi-autonomous vehicles, Robo-cars, delivery vehicles and the like, may provide autonomous or semi-autonomous driving features to reduce the reliance on a driver of the vehicles. The term autonomous or semi-autonomous is being used herein, may be intended to cover at least any automated controlling or other operation of the vehicle or any vehicle subsystem. Thus, the autonomous vehicle (e.g., a self-driving car), may be a vehicle that is capable of sensing its environment and moving safely with little or no human input.

Further, autonomous and semi-autonomous vehicles may represent a myriad of different levels of automated operation. For example, in the United States, the National Highway Traffic Safety Administration (NHTSA) has established an official classification system that is included herein to provide a complete picture of the scale of autonomous vehicle control.

Level 0—The driver completely controls the vehicle at all times.

Level 1—Individual vehicle controls are automated, such as electronic stability control or automatic braking.

Level 2—At least two controls can be automated in unison, such as adaptive cruise control in combination with lane keeping systems.

Level 3—The driver can fully cede control of all safety-critical functions in certain conditions. The car senses when conditions require the driver to retake control and provides a "sufficiently comfortable transition time" for the driver to do so.

Level 4—The vehicle performs all safety-critical functions for the entire trip, with the driver not expected to control the vehicle at any time. As this vehicle would control all functions from start to stop, including all parking functions, it could include unoccupied cars.

Since the autonomous vehicle is driven with little or no intervention of the driver, the autonomous vehicle may include various devices to sense surrounding landforms and objects in real time. In this regard, the driving of autonomous vehicle may be controlled by a central processing engine, which may include a sophisticated artificial intelligence unit. The central processing engine may collect and analyze the input data from the sensing devices and also make driving decisions. For example, based on the input data, the central processing engine makes identification of the surrounding objects, their size, relative distance to them, and their movements relative to the autonomous vehicle. Further, the central processing engine may provide object identification, localization, and path prediction.

In some examples, multiple input devices, such as light detection and rangings (LIDARs), radio detection and rangings (RADARs), single or stereo cameras, or the like may be used by the central processing engine in combination with each other in a process called data fusion. The result of such fusion may be objects placed in 3D Point Cloud. Further, the distance data produced by the LIDARs and RADARs may be combined by 2D data from cameras or 3D data from stereo systems to produce 3D objects in the Point Cloud. Thus, the central processor could be considered as the brain of the autonomous driving (AD)/autonomous driver assist systems (ADAS).

Further, the quality of decisions made by the central processing engine may depend on quality of data provided by the sensing devices. Furthermore, fast, accurate, and high-resolution depth data may be critical for accurate object positioning and prediction of its movements. Also, the AD/ADAS may require inexpensive distance measurements in all weather conditions. Currently, the distance data could be provided by the LIDARs, RADARs, cameras, or by their combination.

However, the LIDAR may have low resolution (e.g., video graphics array (VGA))/low frame rate (e.g., under 20 fps) and poor reception in environmental conditions such as rain, fog, or the like. Even though the LIDARs have accurate distance measurements, long distance LIDARs are quite expensive and may require a significant amount of power to operate. The RADAR may support all-weather, but may include significantly low resolution (e.g., under quarter video graphics array (QVGA)). Because of their low-resolution, the RADARs may be used in combination with cameras. In such cases, the cameras are being used as an input to the central processing engine for object identification. Further, the RADARs may provide the distance and velocity data.

SUMMARY

Examples described herein may generate accurate, high-resolution, and high frame rate distance data (i.e., depth maps) using camera clusters for autonomous driving (e.g., a self-driving vehicle). A camera cluster may refer to a group of cameras which may have different resolutions and different Field of Views (FOVs). Cameras format could be RGB (red, green, blue), YCbCr (green (Y), blue (Cb), red (Cr) (i.e., digital video color space)), monochrome, monochrome with IR filter removed, monochrome with a special filters blocking selected frequencies, and/or the like. This may allow the camera clusters to be multi-spectral. Further, each of the camera clusters may include a central camera and a number of cameras radially positioned relatively to the central camera in one or more directions. Example camera clusters are described in patents numbers U.S. Pat. No. 9,729,857 B2 (hereinafter referred as P1), U.S. Pat. No. 9,900,584 B2 (hereinafter referred as P2), and U.S. Pat. No. 10,326,981 B2 (hereinafter referred as P3).

In one aspect, a depth map may be computed by applying parallax techniques to a number of cameras in the cluster. In one example, the accurate depth map may be computed for every pixel of the central camera and combined with a 2D image of the central camera to form a 3D image, which can be sent to a central processing unit for generation of 3D Point Cloud, objects segmentation, and object recognition. Further, the 3D image data could run as a standalone in the Point Cloud of central processing unit or combined with Radar data, LIDAR data, or other cameras data as part of a fusion process. Example depth map generation with description of depth refinement algorithm is described in P1, P2, and P3. Detailed and extended description of depth refinement is provided in this document In one example implementation, each camera cluster may include a local processor (i.e., an image processing unit), where data from multiple cameras in the camera cluster may be combined for depth map generation. In another example implementation, images from all the camera clusters may be sent directly to a central processor (i.e., a central image processing unit) for the depth map generation, hence eliminating the local processor.

In the examples described herein, a camera cluster-based system may replace some of the LIDARs. The camera clusters described herein may have advantages over the LIDARS because of higher resolution and higher frame rate. Also, examples described herein may efficiently control the autonomous vehicle as the camera clusters can operate in wider range of driving conditions such as light rain, light fog, and the like. In one example, the cluster-based system may be used together with the RADARs complementing each other in the fusion process on the central processor unit.

In yet another aspect, the camera clusters may need to be adapted to the driving conditions of autonomous vehicles in order to address temperature changes and vibrations. In this regard, the camera cluster may be placed on a base made of a low temperature expansion material. It could be further improved to place a temperature sensor on the base and use multiple calibration tables depending on the temperature. Since autonomous driving may require camera system recalibration from time to time, the examples described herein may provide an automatic recalibration method.

Thus, examples described herein may provide the camera clusters, which are significantly more accurate than a stereo system due to having central camera and several cameras placed along one or more epipolar lines. These multiple cameras may provide better sampling for parallax computations. Also, the cameras in cluster are positioned on multiple distances from the central camera, which may allow to have accurate depth map at wide range of distances (e.g., 50 cm-350 m).

BRIEF DESCRIPTION OF THE DRAWINGS

Examples are described in the following detailed description and in reference to the drawings, in which:

FIGS. 2A-2F are block diagrams illustrating example multi-resolution cameras sets arrangements using radial patterns that can be disposed at a front side of an autonomous vehicle, according to an example embodiment;

FIGS. 3A-3D are block diagrams illustrating example multi-resolution cameras sets arrangements using radial patterns that can be disposed at a back side, left side, and/or right side of an autonomous vehicle, according to an example embodiment;

DETAILED DESCRIPTION

Figure 1:
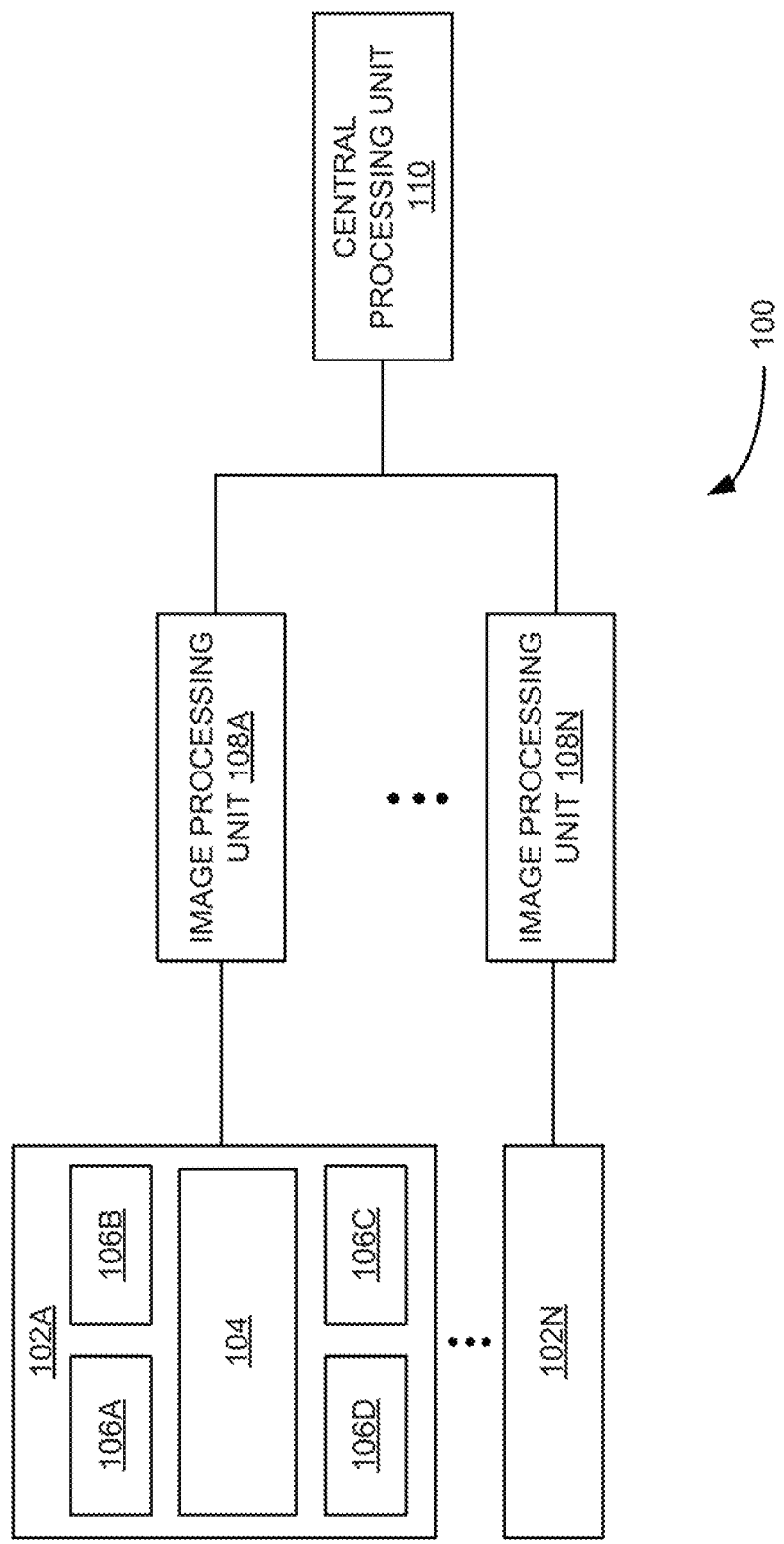
FIG. 1 is a block diagram of an example autonomous vehicle, including a control unit to control the autonomous vehicle based on high-resolution depth maps.

Examples described herein may provide an enhanced computer-based method, technique, and apparatus for controlling autonomous vehicles based on high-resolution depth maps. An autonomous vehicle (e.g., a self-driving car, driverless car, Robo-car, robotic car, semi-autonomous vehicle, delivery vehicle, and the like) may be a vehicle that is capable of sensing vehicle's environment and moving safely with little or no human input. Such autonomous and/or semi-autonomous driving may depend on identification of objects surrounding the vehicle, accurate computation of distances to the objects, objects' velocity, and acceleration.

In some examples, distance computations may be accomplished by technologies such as light detection and ranging (LIDAR), radio detection and ranging (RADAR), and the like. Further, the computed data may be sent to a central processing unit and combined in 3D Cloud, which may be then used by deep learning system to define the autonomous vehicle behavior. In such examples, cameras may be intensively used in the autonomous vehicle for object (e.g., cars, buses, pedestrians, and the like) identification, recognizing traffic signs, dividing lanes, and the like. However, the cameras may not be used for distance and velocity computations of the objects. Thus, the cameras may be part of vehicle ecosystem and used in combination with LIDARS and RADARs for distance computations. In other examples, technologies such as stereo systems and structured lights may be used for the distance and velocity computations.

For example, LIDARs may be used to compute depth. The LIDARs emit laser beams which may be reflected from surfaces of the objects and captured back by the LIDAR. Further, the LIDARs may produce accurate depth measurements. However, the LIDARs may not work well in environment conditions such as rain, fog, heavy snow, and the like because laser beams are poorly reflected from wet surfaces. Thus, the LIDARs may scan surrounding space of the autonomous vehicle and may produce images at frequencies of up to 20 fps. Also, the LIDARs may consume a significant amount of energy to produce beams powerful enough for long distances and hence may be expensive. In addition, distance data produced by the LADARs may have lower resolution than high-definition (HD) cameras.

The RADARs may work in different environment or weather conditions. However, the RADARs may produce images of significantly low-resolution, which may make it difficult to recognize the objects.

Further, the stereo systems may use two cameras, compute distances by comparing two views of a scene captured by the two cameras, and then compute depth for each pixel on the scene by using parallax techniques. Even though the stereo systems are used in the autonomous vehicles, the stereo systems may include limitations in accuracy on wide range of distances, for instance.

Furthermore, in the structured lights technique, a pattern may be projected on all visible surfaces of the scene and then how these patterns are mapped on the surfaces may be analyzed to compute distance and surface data of the objects in the scene. However, the structured lights technology may be limited to short distances outdoors. Example depth map computations for the camera clusters using parallax techniques and the difference from depth map computations for stereo and camera arrays are described in P1, P2, and P3.

Generation of depth maps using camera clusters may have to overcome a number of challenges. The most important challenges may be handling of occlusion areas, holes, accuracy and resolution of depth map, total number of computations to be performed (computational complexity), and/or occlusions. Occlusions may refer to the areas which are seen by some of the cameras, but are not visible from the view of the other cameras because they are in the "shadow" of the other parts of the image (i.e., other objects in the image). Holes are parts of the image where it may not be possible to determine the depth map.

Traditional camera array techniques include using one of the cameras as a reference camera and then for each pixel of reference camera perform parallax shift operation on other cameras in order to determine depth at this pixel. Parallax shift for any given pixel may depend on actual 3D position of this pixel and the distance between the cameras. This process usually involves performing parallax shift for number of depths. Conceptually, parallax shift is performed for each of these depths for all participating cameras in the camera array and then a "cost function" for the depth is being generated. Then the depth with the minimal cost function may be defined as the depth for this pixel. Different implementations are using number of additional techniques for final determination of pixel depth. One of the objectives of these techniques is to find absolute minimum of cost function and to avoid the use of local minimum of cost function as a final depth for given pixel. Parallax computations for camera clusters can use similar techniques.

Initial depth set could be selected to minimize computations and the final depth could be refined by repeating the depth search for the new set of depths close to initial pixel depth. At the end of this process, the final depth for every pixel at reference camera position (i.e., excluding holes) is being determined and depth map is being formed. Thus, the example process may dramatically reduce the total number of depths. With relatively low number of computations, actual depth resolution may be increased to up to 16 bits. The resolution of this final depth map may be typically the resolution of the reference camera.

Examples described herein may provide a method for controlling autonomous vehicles based on high-resolution depth maps. In one example, a set of multi-resolution cameras (i.e., also referred to as a camera cluster) may be disposed on at least one side of an autonomous vehicle. In one example, the set of multi-resolution cameras may include a central camera, having a first resolution, and multiple camera groups, having one or more resolutions that are lower than the first resolution and disposed around the central camera. Further, two-dimensional (2D) images of a scene may be captured using the set of multi-resolution cameras. Upon capturing the 2D images, a low-resolution depth map may be generated for each scene using the captured 2D images of the set of multi-resolution cameras using relatively small depths. Further, a high-resolution depth map may be generated for each scene for a wide depth range by iteratively refining the low-resolution depth map for each scene.

Upon generating the high-resolution depth map, a three-dimensional (3D) video may be generated based on the high-resolution depth maps and the captured 2D images of the central camera. Further, 3D image data associated with each frame may be converted into a point cloud. Furthermore, a distance, a velocity, and/or an acceleration of one or more objects relative to the autonomous vehicle may be computed by analyzing one or more frames of the 3D video. For example, each frame of the 3D video may include the 2D image of the central camera and the corresponding high-resolution depth map.

In one example, the output of the depth map generation is a high frame rate 3D video and computation of the distance, velocity, and/or acceleration of the one or more objects relative to the autonomous vehicle may be computed by analyzing the 3D Video, for instance, using one frame for distance, two consecutive frames for velocity, and three consecutive frames for acceleration on the central processing unit using standard motions estimation techniques.

Further, segmentation, path prediction, and localization of the one or more objects may be computed based on the distance, velocity, and/or acceleration of one or more objects. Furthermore, the autonomous vehicle may be controlled based on the computed segmentation, path prediction, and localization of the one or more objects.

Thus, the examples described herein may produce high definition videos, which may have a depth value at every pixel at rate of up to 60 fps and in some instances up to 120 fps. Further, the examples described herein may produce scalable images with 8 to 16-bit depth range and high depth accuracy at all distances. Also, with the examples described herein, optimized hierarchical depth refinement application or software which has up to 15 times faster parallax computations than existing solutions may be achieved. In addition, the examples described herein may substantially reduce hardware cost and power consumption compared to LIDARs and RADARs technologies.

In the following description, for purposes of explanation, numerous specific details are set forth in order to provide a thorough understanding of the present techniques. Further, the example apparatuses, devices and systems, may be practiced without these specific details. Reference in the specification to "an example" or similar language means that a particular feature, structure, or characteristic described is included in at least that one example, but not necessarily in other examples.

Turning now to the figures, FIG. 1 is a block diagram of an example autonomous vehicle 100, including a central processing control unit 110 to control autonomous vehicle 100 based on high-resolution depth maps. In one example, for autonomous driving, object recognitions and computation of their distance and velocity is critical. One of the critical aspects of successful use of camera clusters is to produce accurate depth values on long, medium and short distances in the range of up to 350 m to up to 50 cm. The accuracy depth using parallax computations directly depend on distances between cameras and number of cameras participating in computations. For the objects located far the distances between cameras should be bigger than for the objects located close. In general, cameras used for depth computations at long distances are positioned (displaced) at further distances from one camera, called central. This may be needed for having bigger angle between corresponding pixels from different cameras in order to have more accurate parallax computations. For distances closer to camera cluster system will use cameras closer (smaller displacement) to central camera. Several but not necessary all cameras could be participating at any distance. Special camera positioning can use up to eleven cameras in cluster to better reflect accurate depth computations at all distances.

As shown in FIG. 1, example autonomous vehicle 100 may include a plurality of sets of multi-resolution cameras (e.g., 102A-102N). In one example, each set of multi-resolution cameras 102 may be disposed on a different side of autonomous vehicle 100. Further, each set of multi-resolution cameras 102 (e.g., first set 102A) may include a central camera 104, having a first resolution, and multiple cameras or camera groups 106A-106D, having one or more resolutions that are lower than first resolution and disposed around central camera 104. The set of multi-resolution cameras may include multi-spectral cameras with multiple field of views. For example, each camera in the set of multi-resolution cameras 102A may have a different field of view. In one example, the cameras or camera groups 106A-106D may be radially positioned substantially around the central camera 104.

In one example, set of multi-resolution cameras 102 may include monochrome cameras, colored cameras, IR cameras, monochrome with IR filter removed cameras, Bayer pattern cameras, monochrome with a special filters blocking selected frequencies or combinations thereof. Further, set of multi-resolution cameras 102 may include narrower field of view cameras, wider field of view cameras, or any combinations thereof. For example, the narrower field of view cameras may capture images at longer distances and the wider field of view cameras may capture images at medium or short distances.

In one example implementation, each camera group 106A may include one camera. In another example implementation, each camera group (e.g., a first camera group 106A) may include a central camera and multiple cameras, having one or more resolutions that are different from a resolution of the central camera of the first camera group and disposed around the central camera of the first camera group. In this example, the central camera of camera group 106A may have a higher resolution than the resolutions of the remaining cameras in the camera group 106A. Example multi-resolution camera set 102 are illustrated in FIGS. 2A through 3D.

As shown in FIG. 1, autonomous vehicle 100 may include a plurality of image processing units (e.g., an image processing unit 108A corresponding to set of multi-resolution cameras 102A, an image processing unit 108N corresponding to set of multi-resolution cameras 102N, and so on). During driving, image processing unit 108A may receive two-dimensional (2D) images of a scene captured by set of multi-resolution cameras 102A. Example two-dimensional image may include one of red green blue (RGB) image, monochrome image, and infrared (IR) image.

Further, image processing unit 108A may generate a low-resolution depth map for each scene using the captured 2D images of the set of multi-resolution cameras using relatively small depths. In one example, image processing unit 108A may downscale the resolution of the captured 2D image of the central camera to be substantially equal to the one of one or more resolutions associated with the cameras of the multiple cameras. Further, image processing unit 108A may generating the low-resolution depth map using downscaled captured image of the central camera and the captured 2D images associated with the multiple cameras using relatively small depths by applying a first parallax shifting operation.

Upon generating the low-resolution depth map, image processing unit 108A may generate a high-resolution depth map for each scene for a wide depth range by iteratively refining the low-resolution depth map for each scene. In one example, image processing unit 108A may refine the generated low-resolution depth map by increasing a number of depths by local depth map refinements and iterative depth map refinements. Upon refining, image processing unit 108A may upscale the resolution of the captured 2D images of the multiple cameras to be substantially equal to the resolution of the captured image of the central camera. Further, image processing unit 108A may generate the high-resolution depth map using the captured image of the central camera, the upscaled captured 2D images of the multiple cameras, and the refined low-resolution depth map by applying a second parallax shifting operation and then increase a number of depths by local depth map refinements and iterative depth map refinements. Furthermore, the image processing unit 108A may generate a three-dimensional (3D) video based on the high-resolution depth maps and the captured 2D images of the central camera. The 3D video may be sent to a central processing and control unit 110 to control the autonomous vehicle 100 as follows.

Further, autonomous vehicle 100 may include central processing and control unit 110 to convert 3D image data associated with each frame into a point cloud to identify dimensions of the one or more objects. Further, central processing and control unit 110 may compute a distance, velocity, and/or acceleration of one or more objects based on the identified dimensions.

Furthermore, central processing and control unit 110 may compute segmentation, path prediction, and localization of the one or more objects based on the distance, velocity, and/or acceleration of one or more objects. Further, central processing and control unit 110 may control the autonomous vehicle based on the computed segmentation, path prediction, and localization of the one or more objects.

In one example, set of multi-resolution cameras 102 may be placed on a low thermal expansion base. Image processing unit 108A may calibrate the set of multi-resolution cameras prior to disposing the set of multi-resolution cameras on the autonomous vehicle. When autonomous vehicle 100 is in driving mode, image processing unit 108A may compute depth maps for the 2D images using different subsets of the multi-resolution cameras during driving of the autonomous vehicle. Further, image processing unit 108A may detect a deviation in the depth maps associated with one or more cameras of the set of the multi-resolution cameras by comparing depth maps associated with the different subsets of the multi-resolution cameras. Furthermore, image processing unit 108A may dynamically recalibrating the one or more cameras by adjusting a calibration parameter based on the detected deviation.

In another example, when autonomous vehicle 100 is in a driving mode, image processing unit 108A may dynamically measuring a temperature surrounding the autonomous vehicle using a temperature sensor. Further, image processing unit 108A may select one of multiple predetermined calibration tables corresponding to the measured temperature. Furthermore, image processing unit 108A may dynamically calibrate the set of multi-resolution cameras using the selected predetermined calibration table.

Thus, examples described herein may provide high resolution depth map by using a multi-resolution camera set including central high-resolution camera surrounded by several radially positioned cameras. Generation of high-resolution depth map could be accomplished in a computationally efficient way by using a hierarchical approach, by initially computing depth maps at lower resolution and using initially relatively small number of depths. The next step is to refine cluster depth maps and then to compute a high-resolution depth map by using high resolution central image, central images of all clusters and clusters depth maps. The depth maps of clusters may be performed which could be further refined at the next stage.

Further, examples described herein may relate to computational photography systems and methods for creating 3 dimensional (3D) images and videos using digital camera clusters consisting of central camera surrounded by a group of specially positioned cameras. Clusters forming the camera set may differ by number of cameras, fields of view (FOV), resolutions and camera types. cameras could position the way which facilitate the accurate depth computations on far, medium and short distances from 350 m to 50 cm for autonomous and semi-autonomous driving. Some of the cameras could be RGB color, monochrome or in IR spectrum. It is also relating to systems and methods of new features introduced by 3D image clusters paradigms, such as use of High-resolution depth maps, autonomous driving, Robo-cars, artificial intelligence, deep learning systems, robotics, 3D security camera systems, generation of high dynamic range images (HDR), high speed video, and number of 3D applications.

In some examples, the functionalities described herein, in relation to instructions to implement functions of image processing unit 108A and 108N, control unit 110, and any additional instructions described herein in relation to the storage medium, may be implemented as engines or modules including any combination of hardware and programming to implement the functionalities of the modules or engines described herein. The functions of image processing unit 108A and 108N and control unit 110 may also be implemented by a respective processor. In examples described herein, the processor may include, for example, one processor or multiple processors included in a single device or distributed across multiple devices.

FIGS. 2A-2F are block diagrams illustrating example multi-resolution camera sets arrangements (e.g., 200A-200F) using radial pattern that can be disposed at a front of an autonomous vehicle, according to an example embodiment.

In FIGS. 2A-2F, the set of multi-resolution cameras may include a central camera 104, having a first resolution, and multiple camera groups (e.g., 106A-106I), having one or more resolutions that are lower than the first resolution and disposed around central camera 104. In one example, multiple camera groups (e.g., 106A-106I) may be substantially radially positioned around central camera 104 as shown in FIGS. 2A-2F.

Further, the set of cameras described in FIGS. 2A-2F may be used for computing accurate depth distances for a long range of depths. For example, several cameras may be positioned far from central camera 104. This arrangement may allow to compute parallax at long and medium distances. Two cameras on horizontal line closed to central camera 104 may be used in parallax computations in medium and short distances and not participating in long distance computations. Further, the cameras in the middle can participate in computations at long, short and medium distances. For each distance in addition to central cameras from the cluster could be used for accurate depth computations. Furthermore, using monochrome cameras with IR filter removed may allow to expand depth capturing at night and other low light conditions. In addition, depending on the required distance range and required accuracy several camera configurations may be considered.

For example, in FIGS. 2A and 2B, nine cameras are located horizontally. Four cameras (e.g., 106A, 106B, 106H, 106I) are placed far away from central camera 104 in order to compute depth at long distances. This allow to have viewing angle enough for accurate parallax computations for long distances. Thus, these four cameras are used together with central camera 104 for long distance parallax computations. Further, a camera (e.g., 106E) located close to central camera 104 and two cameras next to them (e.g., 106D and 106F) may allow accurate parallax computations on short distances and for parallax computations. Further, cameras positioned at medium distances (e.g., 106C and 106G) from central camera 104 may be used at medium distances. Thus, for all distances, at least four cameras may be used in parallax computation to get the depth accuracy as multiple cameras may produce multiple samples to get more accurate result.

For some configurations, there are two cameras positioned vertically with respect of central camera 104. They are participating in parallax computations for all distances to allow better understanding vertical components of the objects and also improving overall accuracy of depth computations. One of these cameras may be monochrome and another RGB. In FIGS. 2C and 2D, seven cameras are located horizontally. The approach to computations is similar to one described in FIGS. 2A and 2B and the difference may be slightly lower depth range. In FIG. 2E, six cameras are arranged in the radial pattern. Further, in FIG. 2F, five cameras are located horizontally. In one example, these configurations may be potentially used in such cases as delivery vehicles which have lower requirements for depth range.

Thus, cameras participating in computations of depths at long distances (e.g., cameras positioned far from central camera 104) may use narrow field of view (FOV) in order to capture significantly more image details at longer distances. In such cases, central camera 104 may have higher resolution with wider FOV or as in configurations which have two central cameras (e.g., in FIG. 2C, one of central cameras 104 has narrower FOV matching FOV of these cameras and a second central camera 202 can have wider FOC matching FOV other cameras), responsible for depth computations at close and medium distances. From efficiency point of view, the cameras with different FOV could be divided into separate clusters. For example, having more image details at long distances by cameras with narrow FOV may allow to have more accurate depth computations at longer distances.

FIGS. 3A-3D are block diagrams illustrating example multi-resolution cameras sets arrangements (e.g., 300A-300D) using radial patterns that can be disposed at a back side, left side, and/or right side of an autonomous vehicle, according to an example embodiment.

In one example, the cameras described in FIGS. 3A-3D may be used for computing accurate depth distances for objects detected at the back side of the autonomous vehicle. Further, the set of cameras in FIGS. 3A-3D may have vertical positioned cameras for more accurate determination of vertical position of some obstacles when the autonomous vehicle is moving backward. Further, cameras set arrangement 300D in FIG. 3D can also be disposed at a side of the autonomous vehicle to identify movement of objects in left or right side relative to autonomous vehicle.

Figure 4:
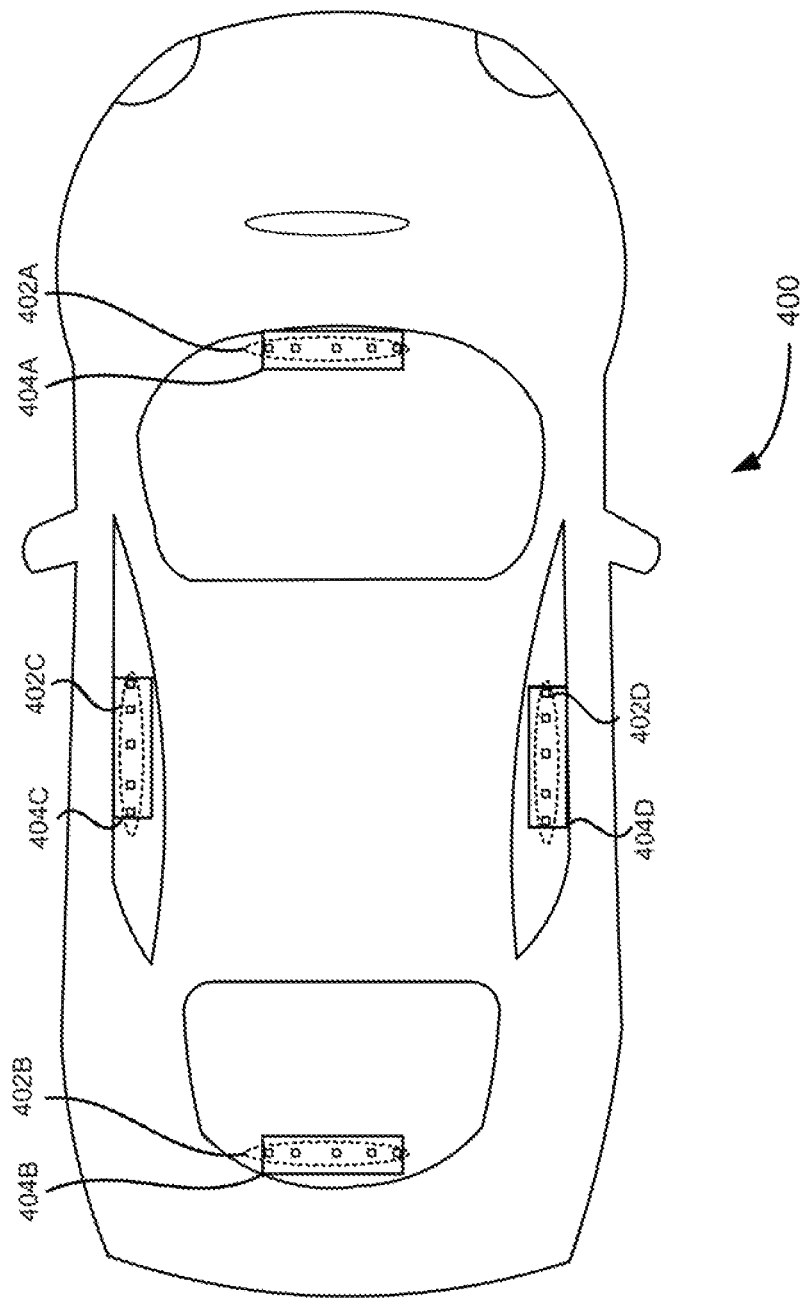
FIG. 4 is a schematic diagram of an autonomous vehicle depicting an example placement of one or more sets of multi-resolution cameras on one or more sides of the autonomous vehicle.

FIG. 4 is a schematic diagram of an example autonomous vehicle 400 depicting example placement of multiple sets of multi-resolution cameras on different sides of autonomous vehicle 400. As shown in FIG. 4, a first set of multiresolution cameras 402A may be placed at a front side of autonomous vehicle 400 (e.g., 402), a second set of multi-resolution cameras 402B may be placed at a back side of autonomous vehicle 400 (e.g., 404), a third set of multi-resolution cameras 402C at a left side of autonomous vehicle 400, and a fourth set of multi-resolution cameras 402D at a right side of autonomous vehicle 400. For example, the set of multi-resolution cameras 402A may be placed at front or dashboard or top of autonomous vehicle 400 (e.g., 402) facing forward to generate distance measurements from about 50 cm to 350 m. Thus, front direction may require computing distance long, medium and short distances. Further, the set of multi-resolution cameras 402B may be placed at back of autonomous vehicle 400 (e.g., 404) to compute short and long distances to the objects. Thus, vertical resolution may be computed to provide distances during parking. Furthermore, the sets of multi-resolution cameras 402C and 402D may be placed on sides of autonomous vehicle 400 (e.g., 406) to provide distance for lane change. For example, three cameras configuration can be placed at the sides of autonomous vehicle 400. In other examples, the sets of multi-resolution cameras 402C and 402D can be replaced by RADARs such that the multi-resolution camera sets 402A and 402B can be used together with the RADARs complementing each other in the fusion process on the central processor unit.

In one example, a number of radial directions in the set of multi-resolution cameras can be at least one (e.g., one, two, or many). For example, in order to achieve accuracy of depth map in horizontal direction, at least three cameras forming horizontal Epipolar line may be placed. Further, multiple cameras along horizontal Epipolar line may significantly increase the accuracy in depth computations. Furthermore, placing more than one camera in vertical direction may improve vertical and overall accuracy of depth computations.

In one example, the set of multi-resolution cameras may be a monochrome, colored, IR, or monochrome with IR filter removed. For example, a central camera may be colored to provide color images. Further, other cameras along the horizontal Epipolar line could be color or monochrome. Furthermore, using monochrome cameras with IR filter removed (e.g., multispectral cameras) may increase overall the sensitivity of cameras and may allow better depth computations at low light conditions. In addition, some automotive companies are adding IR light sources in headlights of autonomous vehicles. Such illumination may further improve night performance of multi-spectral camera.

In one example, initial calibration of the set of multi-resolution cameras may be performed before installation of the set of multi-resolution cameras on autonomous vehicle 400 as maintaining accurate distances between the cameras is important for accurate depth computation. Further, during the driving, a temperature could be substantially changed during day and night. Thus, distances between the cameras may be changed and thus affect calibration. In this case, the calibration maintenance can be improved by precise positioning of cameras and by using low expansion materials for the base plate on which the set of multi-resolution cameras to be placed. As shown in FIG. 4, sets of multi-resolution cameras 402A-402D may be disposed on low expansion bases 404A-404D, respectively.

Further, other aspects of the driving conditions such as camera shacking and vibration can also affect the accuracy of initial calibration. However, since multiple sets of cameras are disposed, the depths for number of images using different subsets of cameras may be computed. Further, one or more cameras producing different depth results may be identified and the information may be used for adjusting the calibration parameters of the cameras, which have higher depth deviations than other cameras.

Figure 5A:
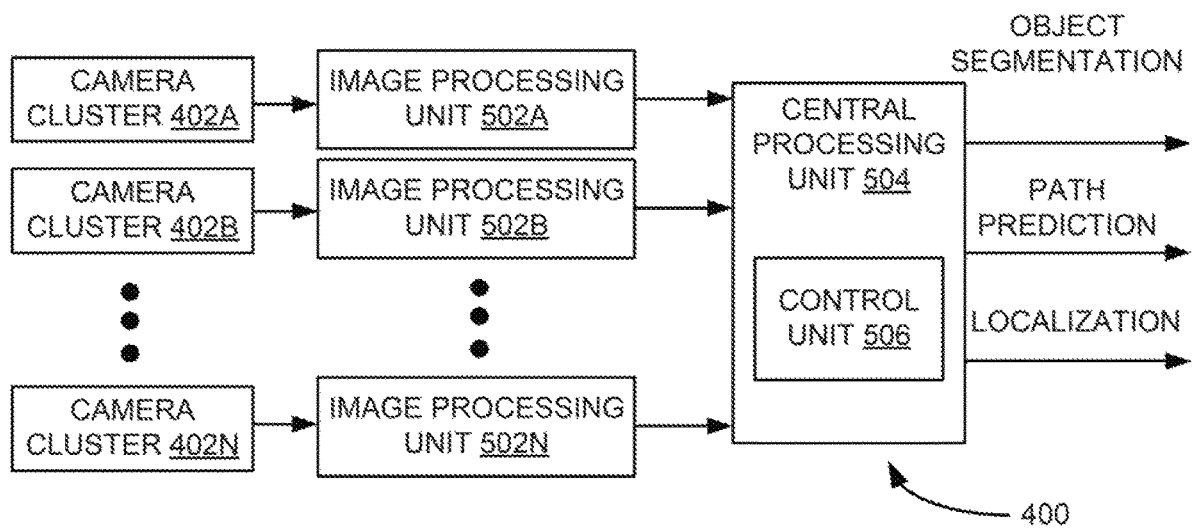
FIG. 5A is a block diagram of an example autonomous vehicle, in which each camera cluster may include a local image processing unit to generate depth maps.

FIG. 5A is a block diagram of an example autonomous vehicle 400, including a central processing unit 504 to control autonomous vehicle 400, according to an example embodiment. In one example implementation, autonomous vehicle 400 may include local processors (i.e., image processing units 502A-502N) corresponding to the sets of multi-resolution cameras 402A-402N, respectively. In one example, image processing unit 502A may receive two-dimensional images of a scene from the set of multi-resolution cameras 402A. Further, image processing unit 502A may generate a high-resolution depth map for a wide depth range by performing a parallax warping and computing corresponding variances on neighboring pixels of each pixel in at least one of the received images of a central camera and multiple camera groups of the set of multi-resolution cameras. Also, image processing unit 502A may generate a three-dimensional (3D) video based on the high-resolution depth maps.

Further, autonomous vehicle 400 may include a control unit 506 in a central processing unit 504. In one example, control unit 506 may compute a distance, a velocity, and/or an acceleration of an object relative to autonomous vehicle 400 by analyzing the one or more frames of the 3D video. Based on the computed distance, velocity, and/or acceleration, object segmentation, path prediction, and localization (e.g., traffic signs, lane marking/attribute, road furniture, and the like) may be determined. Thus, control unit 506 may control autonomous vehicle 400 based on the computed distance, velocity, and/or acceleration.

Figure 5B:
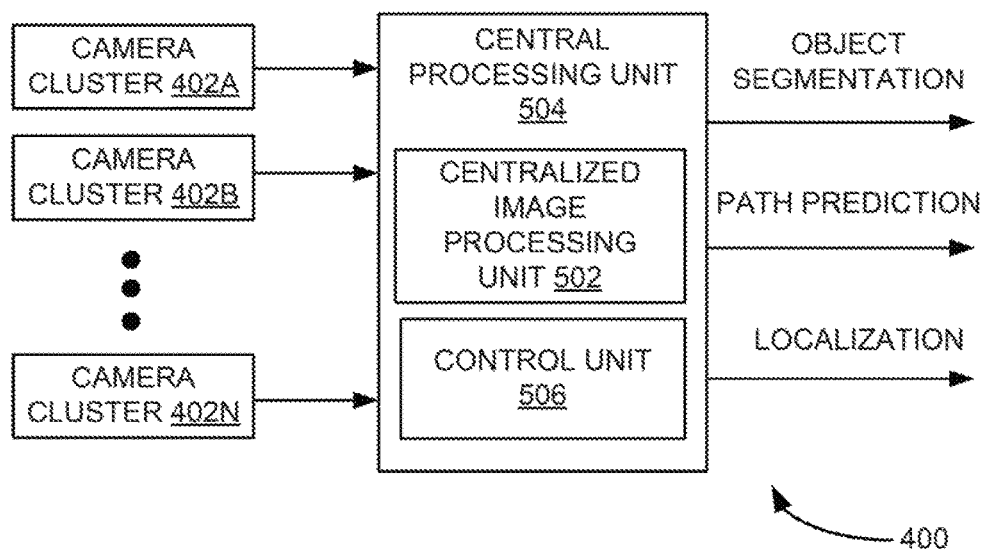
FIG. 5B is a block diagram of another example autonomous vehicle, in which images from all camera clusters may be sent to a central image processing unit to generate the depth maps.

FIG. 5B is a block diagram of example autonomous vehicle 400, including central processing unit 504 to control autonomous vehicle 400, according to another example embodiment. In the example implementation shown in FIG. 5B, central processing unit 504 may include centralized image processing unit 502 and control unit 506. In one example, images captured by multiple sets of multi-resolution cameras 402A-402N may be transmitted directly to central processing unit 504, where centralized image processing unit 502 may compute high-resolution depth maps and 3D video, and control unit 506 may compute the distance, velocity, and acceleration data of the one or more objects to control autonomous vehicle 400.

Further, control unit 506 may control autonomous vehicle 400 using an artificial intelligence (AI)/deep learning system.

Hence, there can be two possible architectures of operation local and central, such as:
  Local depth processing using a processor on each set of camera cluster. In this case, smaller data including one image and depth map being sent to Al/Deep learning network (e.g., as shown in FIG. 5A).
  If central processor handling Al/Deep learning network is powerful enough and data bandwidth is allowed all data from individual cameras could be sent to central processor and all depth computations are performed on central processor. This is the tradeoff on saving on local processor and loading central processor with extra computations and having higher data bandwidth (e.g., as shown in FIG. 5B).

Figure 6:
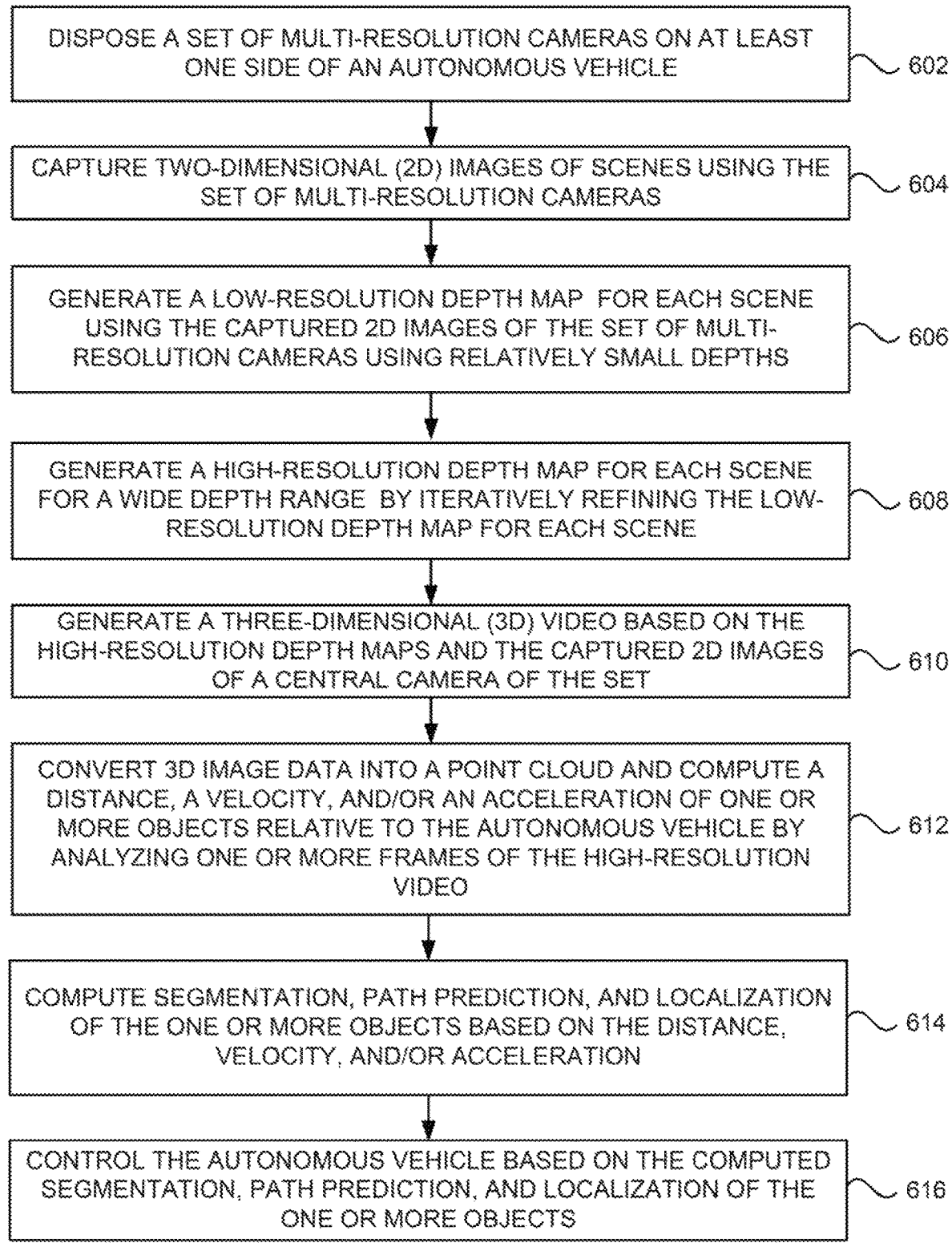
FIG. 6 is a flowchart illustrating an example method for controlling an autonomous vehicle based on high-resolution depth maps.

FIG. 6 illustrates an example method 600 for controlling an autonomous vehicle based on high-resolution depth maps. It should be understood that the process depicted in FIG. 6 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 602, a set of multi-resolution cameras may be disposed on at least one side of the autonomous vehicle. In one example, disposing the set of multi-resolution cameras may include placing the set of multi-resolution cameras on a low thermal expansion base. Example set of multi-resolution cameras may include a central camera, having a first resolution, and multiple camera groups, having one or more resolutions that are lower than the first resolution and disposed around the central camera. For example, the central camera having the first resolution may include the central camera having a higher resolution than the cameras in the multiple camera groups. Further, the set of multi-resolution cameras may include monochrome cameras, colored cameras, IR cameras, monochrome with IR filter removed cameras, Bayer pattern cameras, monochrome with a special filters blocking selected frequencies or combinations thereof.

In one example, the multiple camera groups having the one or more resolutions that are different from the first resolution may include the camera group having the one or more resolutions that are lower resolution than the central camera having the higher resolution. Further, a central camera of each camera group having a higher resolution than the resolutions of the remaining cameras in the multiple camera groups. Example camera groups may be radially positioned substantially around the central camera.

In one example, each camera of the set of multi-resolution cameras may have a different field of view. For example, the set of multi-resolution cameras may include different field view cameras including narrower field of view cameras and wider field of view cameras. Example narrower field of view cameras capture images at longer distances and the wider field of view cameras capture images at medium or short distances.

At 604, two-dimensional (2D) images of a scene may be captured using the set of multi-resolution cameras. In one example, the 2D image may include one of red green blue (RGB) image data, monochrome image data, and infrared (IR) or monochrome image data with IR filter removed image data.

At 606, a low-resolution depth map may be generated for each scene using the captured 2D images of the set of multi-resolution cameras using relatively small depths. In one example, generating the low-resolution depth map for each scene may include downscaling the resolution of the captured 2D image of the central camera to be substantially equal to the one of one or more resolutions associated with the cameras of the multiple cameras and generating the low-resolution depth map using downscaled captured image of the central camera and the captured 2D images associated with the multiple cameras using relatively small depths by applying a first parallax shifting operation.

At 608, a high-resolution depth map may be generated for each scene for a wide depth range by iteratively refining the low-resolution depth map for each scene. In one example, generating the high-resolution depth map for each scene may include refining the generated low-resolution depth map by increasing a number of depths by local depth map refinements and iterative depth map refinements, upscaling the resolution of the captured 2D images of the multiple cameras to be substantially equal to the resolution of the captured image of the central camera, and generating the high-resolution depth maps using the captured image of the central camera, the upscaled captured 2D images of the multiple cameras, and the refined low-resolution depth map by applying a second parallax shifting operation and then increasing a number of depths by local depth map refinements and iterative depth map refinements.

At 610, a three-dimensional (3D) video may be generated based on the high-resolution depth maps and the captured 2D images of the central camera. At 612, a distance, a velocity, and/or an acceleration of one or more objects relative to the autonomous vehicle may be computed by analyzing one or more frames of the 3D video. For example, each frame of the 3D video may include the 2D image of the central camera and the corresponding high-resolution depth map. In one example, computing the distance, velocity, and/or acceleration of one or more objects may include converting 3D image data associated with each frame into a point cloud to identify dimensions of the one or more objects and computing the distance, velocity, and/or acceleration of one or more objects based on the identified dimensions.

At 614 and 616, the autonomous vehicle may be controlled based on the computed distance, velocity, and/or acceleration of the one or more objects. In one example, the autonomous vehicle may be controlled by computing segmentation, path prediction, and localization of the one or more objects based on the distance, velocity, and/or acceleration of one or more objects and controlling the autonomous vehicle based on the computed segmentation, path prediction, and localization of the one or more objects.

In one example, the set of multi-resolution cameras may be calibrated prior to disposing the set of multi-resolution cameras on the autonomous vehicle. Further, a temperature surrounding the autonomous vehicle may be dynamically measured using a temperature sensor. For example, the temperature changes may cause distance changes between the cameras. Based on the sensed temperature, one of multiple predetermined calibration tables may be selected corresponding to the measured temperature in order to compensate for the distance changes between the cameras. Further, the selected predetermined calibration table may be utilized to generate the high-resolution depth maps.

In another example, depth maps for the two-dimensional images may be computed using different subsets of the multi-resolution cameras during driving of the autonomous vehicle. Further, a deviation in the depth maps associated with one or more cameras of the set of the multi-resolution cameras may be detected by comparing depth maps associated with the different subsets of the multi-resolution cameras. Furthermore, the one or more cameras may be dynamically recalibrated by adjusting a calibration parameter based on the detected deviation.

Thus, a method for accurate depth map generation for autonomous and semi-autonomous driving may include:

Capturing images using one or several multiresolution camera clusters for accurate depth map computations for wide depth range.

Camera clusters with narrower field of view may be used for computation of depth map at longer distances. Camera at these clusters are positioned further from their central camera for more accurate parallax computations at longer distances. Narrow field of view allow to capture details at longer distances. Clusters with wider field of view can be used for depth map computation for medium or short distances.

Multispectral approach can help to improve depth computations at different lighting conditions. This may include monochrome cameras with IR filter removed to facilitate better capturing at when it dark. At night, vehicles may also have IR headlights to further improve night visibility for cameras.

Camera clusters can be placed on low temperature expansion base to minimize distance changes between cameras due to temperature changes. This will allow more reliable calibration for camera clusters.

Additional improvements of the calibration accuracy will be to compute several calibration tables for different temperatures and place the temperature sensor to control which calibration table to use.

Automatic recalibration can be performed by computing the depth for several images during driving using different subsets of cameras and adjusting of calibration parameters by comparing depths for different subsets.

Not all cameras can be placed on the same low expansion base. For example, some cameras can be positioned further from the central camera. In such cases more frequent recalibration due to temperature changes, or other factors may be required. Using the described method, recalibrate these cameras using relatively more stable set sitting on low temperature expansion base may be achieved.

The demand for efficient computations of 3D videos with high frame rates requires very efficient algorithms. Depth refinement algorithm may allow to dramatically reduce the number of computations especially for when depth map is computed at precision of 10 bits of depth or higher.

Depth map computations can be performed on specialized local processor in order to reduce the amount of data sent to the central processor. Typical PC level processor may be sufficient for such computations or computed on central processor in order to reduce the cost of the device by eliminating the local processor.

Figure 7:
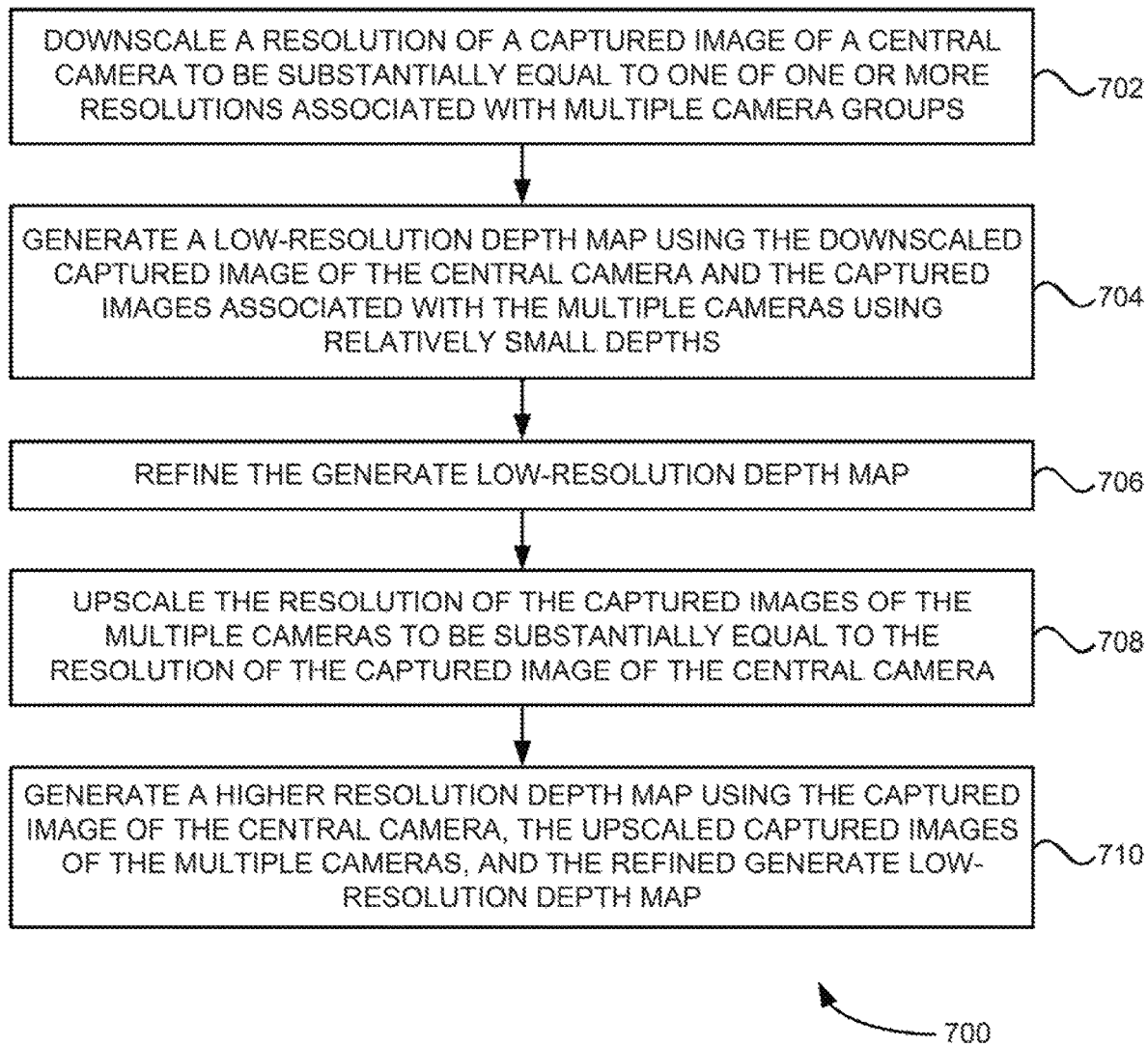
FIG. 7 is a flow diagram illustrating an example process for generating high-resolution depth maps using multi-resolution camera group.

FIG. 7 is a flow diagram illustrating an example process 700 for generating high-resolution depth maps using multiresolution camera group. At 702, resolution of a captured image by a central camera may be downscaled to be substantially equal to one of one or more resolutions associated with cameras in multiple camera groups.

At 704, a low-resolution depth map may be generated using the downscaled captured image of the central camera and the captured images associated with the multiple camera groups using relatively small depths. In one example, multi-view parallax techniques may be used to compute depth map for each pixel visible by two or more cameras. This may be done by computing parallax shift for every depth using all cameras from which the particular pixel is visible and finding a best possible match. At this stage, cameras that do not see these pixels may be excluded from computations for a given pixel. The use of partial summations and computations along the Epipolar lines may reduce total amount of computations needed to make the final result more accurate. For example, all of the initial parallax computations are performed using intensity Y color component.

In another example, parallax shift for all pixels in all images may be performed to match corresponding pixels in reference image. Because parallax shift is proportional to inverse distance to the camera, inverse distances (disparities) may be used in the depth map computations. Parallax shift may also depend on distance between cameras and may be constant for given camera at given depth.

At 706, the generated low-resolution depth map may be refined by increasing a number of depths by local depth map refinements and iterative depth map refinements. Example refining of the low-resolution depth map is described in FIG. 8. At 708, the resolution of the captured images of the multiple camera groups may be upscaled to be substantially equal to the resolution of the captured image of the central camera. In one example, different upscaling methods such as a bilinear upscaling, bicubic upscaling, polyphase upscaling, custom upscaling, and the like may be used for upscaling process. Further, the quality of final depth map may depend on the quality of upscaling based on type of chosen upscaling method. In addition to upscaling low-resolution images, low-resolution depth map may also be upscaled using the same upscaling method.

At 710, the high-resolution depth map may be generated using the captured image of the central camera, the upscaled captured images of the multiple camera groups, and the refined generated low-resolution depth map. In one example, a process for generating the high-resolution depth maps may use upscaled low-resolution images and/or upscaled low-resolution depth map. In the example, the process for high-resolution depth map may be essentially the same as the generation of low-resolution depth map and uses upscaled low-resolution depth map, upscaled low-resolution images and/or central high-resolution image.

Figure 8:
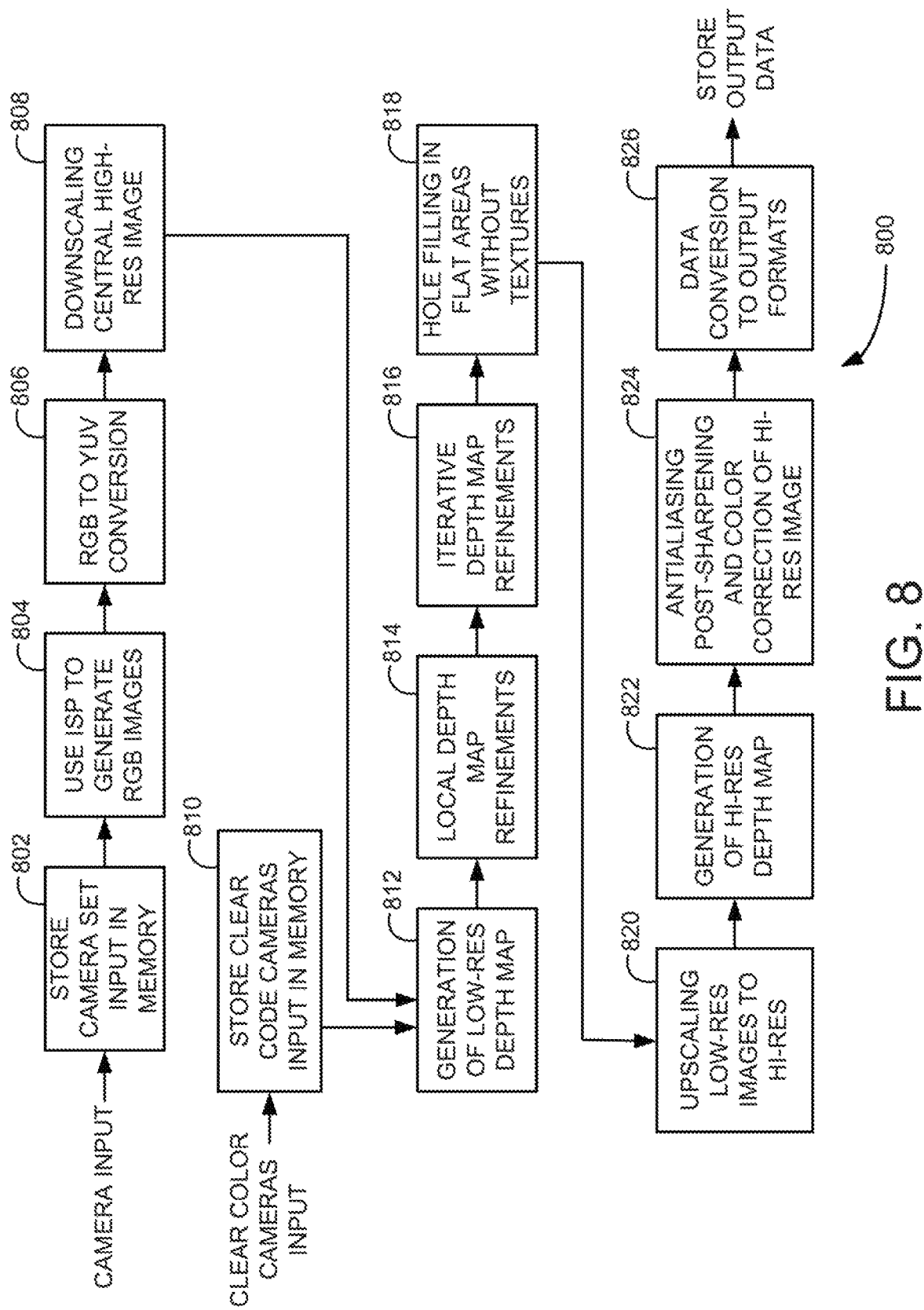
FIG. 8 is a flow diagram illustrating an example process for generating a high-resolution depth map using single or multi-resolution camera groups.

FIG. 8 is a flow diagram illustrating an example process 800 for generating a high-resolution depth map using multi-resolution camera groups. At 802, 3D high-resolution mode RGB images (e.g., in Bayer pattern) in the camera set may be captured and stored in main memory, for example, using MIPI interface, GMSL instance, or the like. For example, in case of a camera set having clear color (i.e., transparent) cameras, their input may also be captured and stored in the main memory. Further, in order to minimize power consumption of the initial stage of computation, process 800 may utilize image signal processing (ISP) to perform demosaicking, and other operations required to generate RGB images for all Bayer pattern cameras, at 804. In one example, images stored in the memory may be transmitted to the ISP sequentially and the resulting RGB images may be transmitted back to store the RGB images.

At 806, the RGB images may be converted to YUV or YCrCb formats to use the Luma component Y as a source of depth computations in multi-camera parallax and having chroma components playing complimentary role. At 808, the resolution of the captured image of the central camera may be downscaled to be substantially equal to the one of one or more resolutions associated with the cameras of the multiple camera groups. At 810, clear color cameras input may be stored in the memory.

At 812, a low-resolution depth map may be generated using all pixels in the downscaled captured image of the central camera, and luma and chroma components in the YUV and/or YCrCb format of the captured images associated with the multiple camera groups using relatively small depths by performing a parallax warping and computing corresponding variances on neighboring pixels of each pixel and obtaining a global minimum depth value for every pixel as pixel depths. In one example, initial set of depths may be used for every pixel for depth map computation.

At 814 and 816, in the generated low-resolution, the total number of depths in the depth map may be increased using a refining method applied for every pixel, obtain global minimum depth values as pixel depths, and further computing updated global minimum depth values using current depth values and additional new depth values around current depth values, and replacing old global minimum depth values with the updated global minimum depth values, which creates a number of new depths in the updated refined depth map, wherein the generated low-resolution depth map is iteratively refined using the replaced updated global minimum depth values. Thus, the example process may be interactively repeated several times to raise depth map resolution up to 16 bits with relatively low number of computations.

In one example, the total number of depth computations per pixel may be achieved by starting parallax depth computations for every pixel with relatively small number of depths. After this task had been accomplished, then for every pixel local iterative depth refining may be performed. For example, initially 512 depths which represent 8 bit depth resolution may be considered. Further, depth step may be reduced by factor of 16 in the neighborhood of every current depth value. If depth value for particular pixel was 312, then depth values for the levels may be computed (e.g., 312+$\frac{1}{16}$, 312+$\frac{1}{8}$, 312+$\frac{3}{16}$, . . . 312+$\frac{1}{2}$, 312−$\frac{1}{16}$, 312−$\frac{1}{8}$, 312−$\frac{3}{16}$, . . . 312−$\frac{1}{2}$, and the best depth value for this pixel out of these 16 depths may be selected). Thus, depth resolution may be increased to 12 bits. Further, the process may be repeated to increase depth resolution to 16 bits. Thus, the total number of depths computations per pixel may be 512+16+16=544. In contrast, in existing methods, the total number of depths computations per pixel may be 65,536.

At 818, flat areas without textures may be filled, referred as hole filing. For example, during generation of depth map, which particular areas of the image having flat areas without textures depth are determined for all pixels in such areas. This may be performed by computing a confidence map. The confidence map could have loss value for two reasons, one being flat areas without texture and the other being occlusion zone. The occlusion zone in low confidence maps areas may be removed by using several separate groups of cameras and when some of them have high confidence values then we do not use them in active light texturing. For the remaining areas, the commutation of depth maps may be performed by using infra-red cameras.

At 820, the resolution of the captured images of the multiple camera groups may be upscaled to be substantially equal to the resolution of the captured image of the central camera. For example, the results of active lite texturing may be upscaled and then all pixels in flat areas without textures may be replaced by these values. Due to relatively low-resolution, the depth map using active illumination could be computed for all pixels parallel to the normal depth map. Upscaling and pixel replacements may be performed in flat areas.

At 822, the high-resolution depth maps may be generated from the upscaled low-resolution images. At this stage, the same depth map refinements and iterative depth map refinements as described in 814 and 816 may be applied. At 824, post-sharpening and color correction of the 3D high-resolution image may be performed using antialiasing. In one example, using final depth map warp for all up-sampled images, all pixels into reference image may be sharpened using antialiasing process. Further, complimentary structure to hold values of the pixels may be created which are placed into area of particular reference pixel together with distance to pixel center. Furthermore, normalized weighted sum included reference pixel may be computed for each pixel in the reference image. Reference pixel may have a much higher weight than warped pixels. The weight may be computed based on the distance from the center. In one example, post-sharpening methods such as bilateral filters may be used. Also, color correction methods such as tone curves may be used. At 826, the high-resolution depth map may be converted into desired output formats and stored in the memory.

Thus, existing antialiasing in computer graphics is being performed by generating image, which has resolution higher than resolution of the final output and then using special down-sampling filters. According to the examples described herein, super-resolution image is not generated, but additional information per pixel such as up scaled low-resolution images and final depth map are considered. Hence, antialiasing may include warping pixels from the images to high-resolution image and adding them with relatively low weights to the original high-resolution image.

Further, the resulting high-resolution image and high-resolution depth map may be stored as the raw data or being compressed to different existing file formats as two connected images using methods of these standards. Final output data could be stored in memory or sent out via Internet. There are several ways to store the data. The major choices are: RGB or YUV image plus depth map, original raw data of camera input to allow offline post-processing of data, which has less computational constrains and therefore allows to receive more accurate results, and original compressed data, final RGB or YUV image plus depth map. This will allow later offline post-processing.

Figure 9:
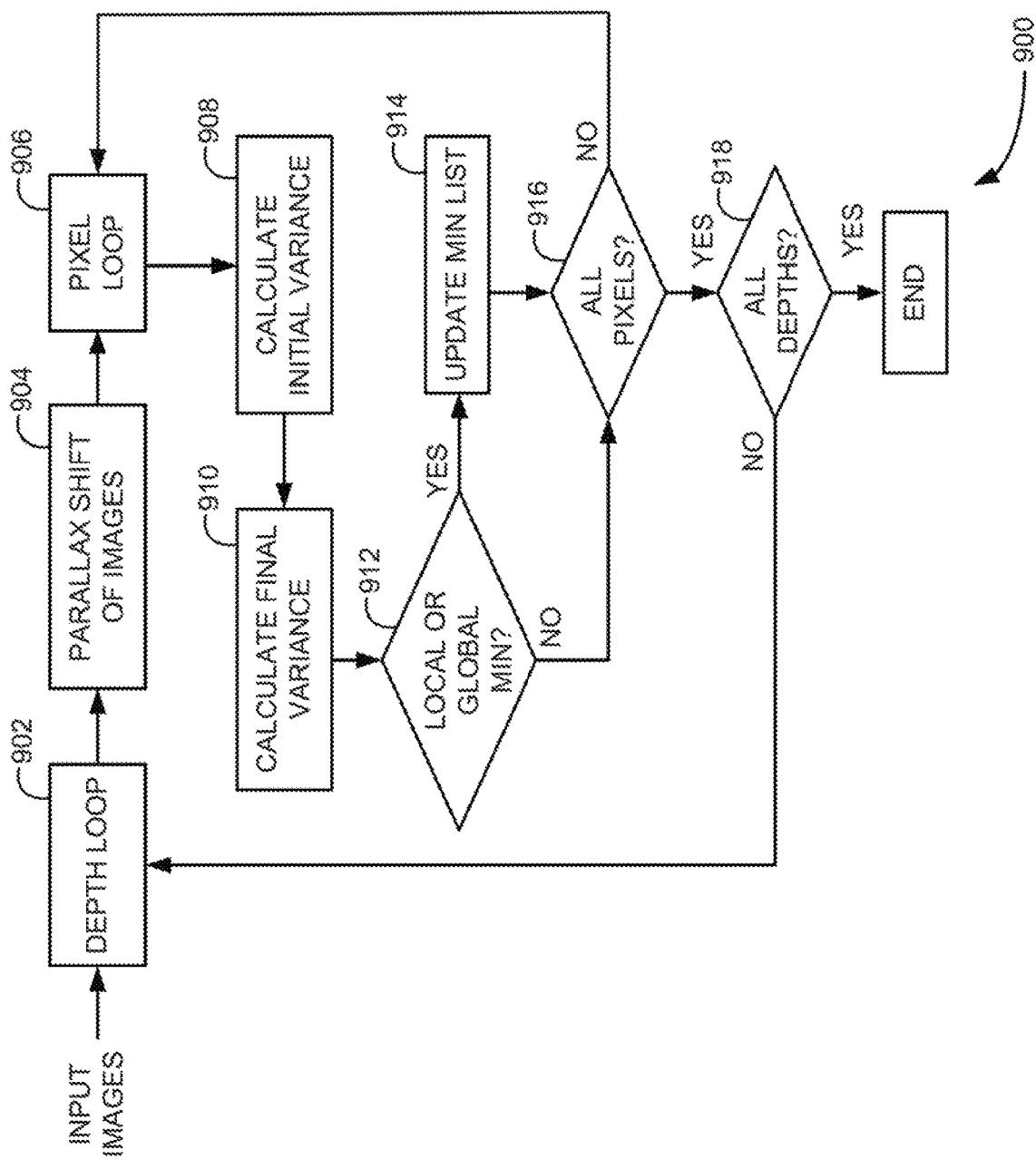
FIG. 9 is a flow diagram illustrating an example process for generating the low-resolution depth map as shown in FIG. 8.

FIG. 9 is a flow diagram illustrating an example process for generating low-resolution depth map as shown in block 812 of FIG. 8. The main loop may perform depth computations for one depth at a time for all pixels. Initially, actual depth may not be known and therefore, operation for all depths in the initial relatively small depth set may be performed, at 902. At 904, for a given depth, parallax shift of all images may be performed and shifted images are generated. At 906, for every pixel in the reference image, a possible best match of this pixel in the neighborhoods may be determined in order to find the best matching pattern. For example, the neighborhoods may be of size 3.times.3 or 5.times.5 pixels.

At 908, an initial variance may be calculated. Further at 910, a final variance may be calculated. For example, actual pattern matching may be done by computing a sum of variances between corresponding pixels of reference and other images. During these computations. minimum and maximum deltas between reference and other pixels in the neighborhood may be determined. Further, for each pixel, minimum and maximum deltas may be discarded, and the final variance may be recomputed. At 912, a check may be made to determine whether the final variance corresponds to a local or global minimum. If so, global minimum list may be updated at 914. Further, all pixels' depths for two previous depth levels are stored and a minimum list is maintained for each pixel, which contains global and local minimum variances. Variance of current depth for global minimum and variance of previous depth for local are checked, at 916 and 918. In one example, depth with global minimum value may be used as a pixel depth for the depth map. Depths from local depth minimum list may be used as input to depth map refinements process. Further, minimum list may be computed, at 914. Furthermore, process 900 may be is repeated until all pixels for all depths in initial depth set are computed.

Figure 10:
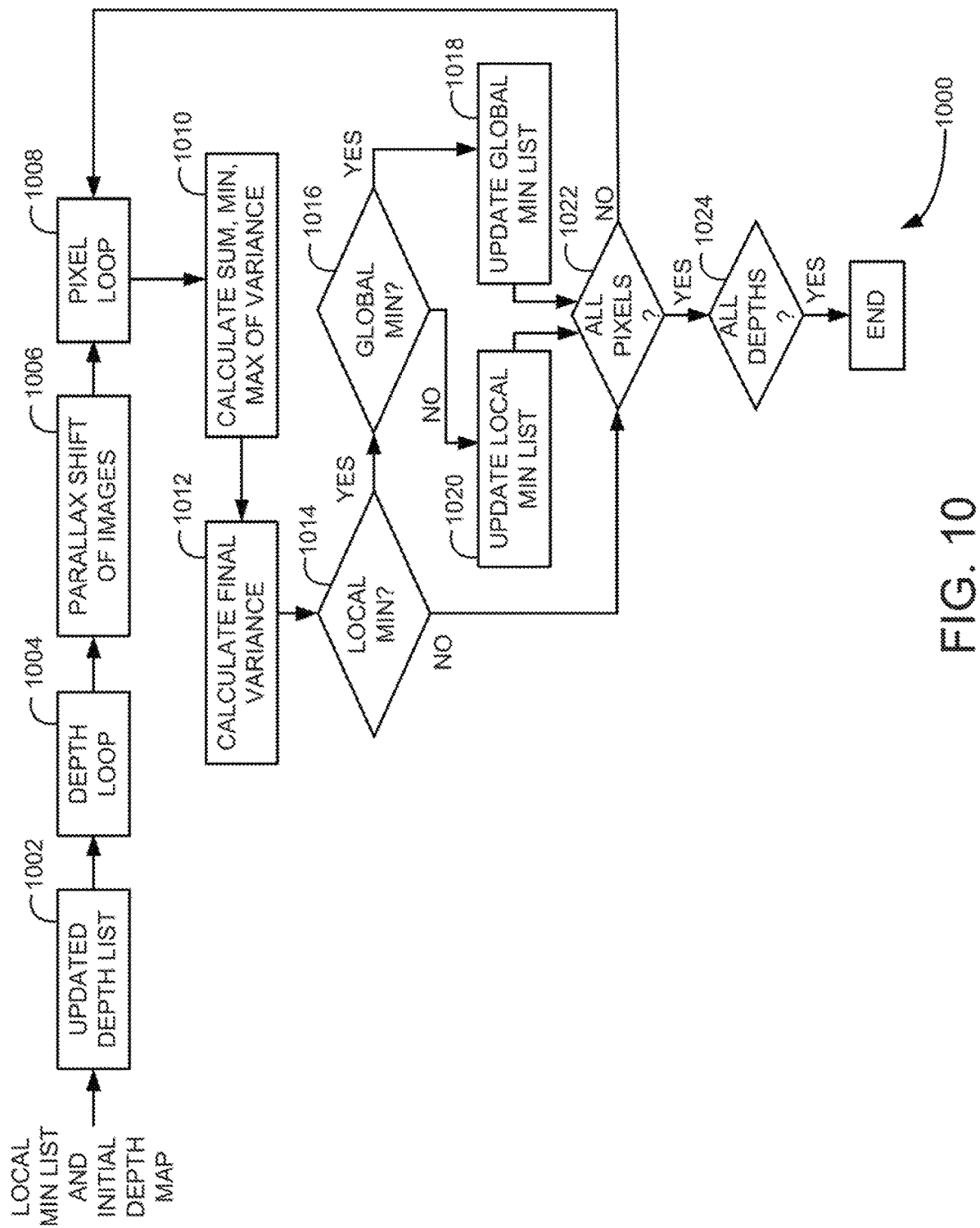
FIG. 10 is a flow diagram illustrating an example process for depth map refinements as shown in FIG. 8.

FIG. 10 is a flow diagram illustrating an example process 1000 for depth map refinements as shown in blocks 814 and 816 of FIG. 8. The main loop may perform a number of depth computations and comparisons per individual pixels. At 1002, depths from local minimum list may be used as input in depth map refinements process 1000. At 1004, operation for all depths in the updated depth list may be performed. At 1006, for a given depth, parallax shift of all image may be performed and shifted images are generated. At 1008, for every pixel in the reference image, a possible best match of this pixel in the neighborhoods may be determined in order to find the best matching pattern.

At 1010, a sum, minimum and maximum of variance may be calculated. Further at 1012, a final variance may be calculated. For example, actual pattern matching may be done by computing a sum of variances between corresponding pixels of reference and other images. During these computations. minimum and maximum deltas between reference and other pixels in the neighborhood may be determined. At 1014, a check may be made to determine whether the final valiance corresponds to a local minimum. If so, a check is made to determine whether the variance corresponds to a global minimum, at 1016. Based on the decision at 1016, a local minimum list (e.g., at 1020) and a global minimum list (e.g., 1018) may be updated. Further, process 1000 may be is repeated until all pixels (e.g., at 1022) for all depths (e.g., 1024) in the updated depth set are computed. Similarly, the generated high-resolution depth map as shown in block 822 can be iteratively refined using the process shown in FIG. 10.

Thus, examples described herein may to generate a high depth resolution depth map for high speed video using a multi-resolution camera clusters and using depth refinements approach to minimize the number of computations.

Further, the demand for efficient computations of high-resolution 3D videos with high frame rates requires very efficient algorithms. Depth refinement algorithm will allow to dramatically reduce the number of computations especially for when depth map is computed at precision of 10 bits of depth or higher Furthermore, depth map computations can be performed on specialized local processor in order to reduce the amount of data sent to the central processor. Typical PC level processor may be sufficient for such computations or computed on central processor in order to reduce the cost of the device by eliminating the local processor.

Thus, iterative depth map refinements at low-resolution may be an optional step. These refinements will be performed on the neighborhood of edges. A source to noise ratio (SNR) may be used to define these areas. "Silhouette" edges i.e. the edges where there is a jump in depth between different sides of the edge may be considered. The silhouette edges also an indication that there could be an occlusion zones for some cameras. For example, the input to this algorithm is low-resolution images downscaled central Image and refined depth Map. There will be one or more iterations in this process. Each iteration will process all pixels in the reference image. For each pixel in the reference image, SNR may be computed. For example, a SNR block size may be 5×5 or 7×7. It will use camera calibration data, camera noise model and predefined threshold, which are specific for vendor and vendor's model. Further, the SNR may be compared to threshold, and if SNR value for pixel is above the threshold, parallax warping of pixels in neighborhood of this pixel from the reference image may be performed using current depth map to all other images and corresponding variances may be computed. If the variance for one or more images is substantially higher than the variance for other Images, then it be concluded that these images this pixel is occluded and recomputing pixel's depth value excluding occluded pixels and store this depth value in the depth map. After computing all pixels, the process may be repeated in the next iteration using the updated depth map.

Further, examples described herein may hole Fill in flat areas without textures. Because depth map for these areas is not defined, one of the extrapolation methods may be selected to move inward from the boundary of these areas, where depths is defined. There are number of ways to perform such operation. The simplest method is to use "sliding window" on computed depth map. This window could be 3×3 or 5×5. Further, the same method could be used to fill depths in occlusion areas.

In the examples described herein, total amount of pixels on which parallax is performed may be minimized by going to 2× lower resolution and then up-sampling image back to the original resolution. Thus, a factor of four times the total original number of parallax computation may be reduced. Further, the interpolation may require substantially less computations.

In one example, the total number of depth computations per pixel may be achieved by starting parallax depth computations for every pixel with relatively small number of depths. After this task had been accomplished, then for every pixel local iterative depth refining may be performed. For example, initially 512 depths which represent 8 bit depth resolution may be considered. Further, depth step may be reduced by factor of 16 in the neighborhood of every current depth value. If depth value for particular pixel was 312, then depth values for the levels may be computed (e.g., 312+$\frac{1}{16}$, 312+$\frac{1}{8}$, 312+$\frac{3}{16}$, . . . 312+$\frac{1}{2}$, 312−$\frac{1}{16}$, 312−$\frac{1}{8}$, 312−$\frac{3}{16}$, . . . 312−$\frac{1}{2}$, and the best depth value for this pixel out of these 16 depths may be selected). Thus, depth resolution may be increased to 12 bits. Further, the process may be repeated to increase depth resolution to 16 bits. Thus, the total number of depths computations per pixel may be 512+16+16=544. In contrast, if existing method computing may include total number of depths computations per pixel as 65,536.

Figure 11:
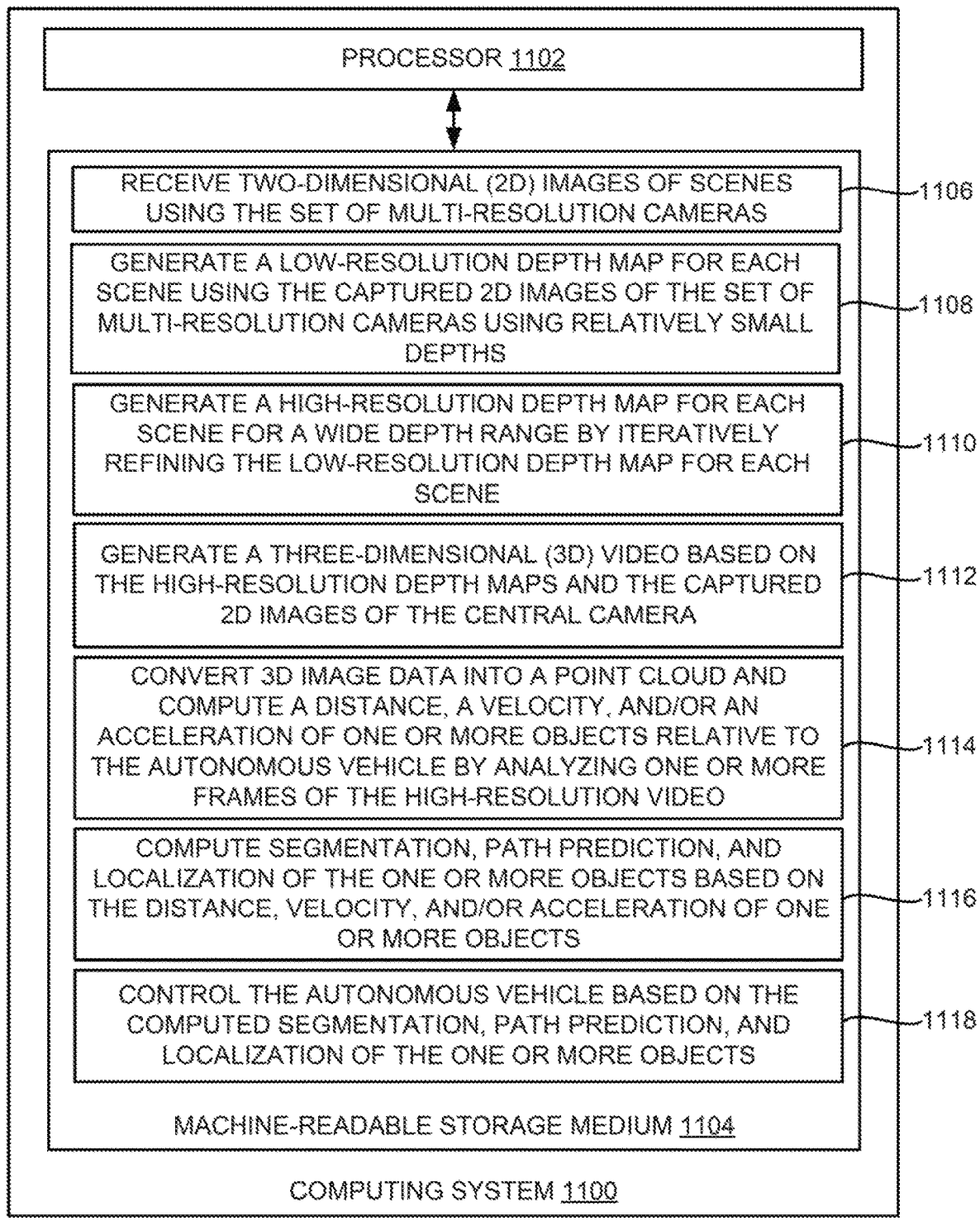
FIG. 11 is a block diagram of an example computing device including non-transitory computer-readable storage medium storing instructions to control an autonomous vehicle based on high-resolution depth maps.

FIG. 11 is a block diagram of an example computing device 1100 including non-transitory computer-readable storage medium storing instructions to control an autonomous vehicle based on high-resolution depth maps. Computing system 1100 may include a processor 1102 and a machine-readable storage medium 1104 communicatively coupled through a system bus. Processor 1102 may be any type of central processing unit (CPU), microprocessor, or processing logic that interprets and executes machine-readable instructions stored in machine-readable storage medium 1104. Machine-readable storage medium 1104 may be a random-access memory (RAM) or another type of dynamic storage device that may store information and machine-readable instructions that may be executed by processor 1102. For example, machine-readable storage medium 1104 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 1104 may be a non-transitory machine-readable medium. In an example, machine-readable storage medium 1104 may be remote but accessible to computing system 1100.

Machine-readable storage medium 1104 may store instructions 1106-1114. In an example, instructions 1106-1118 may be executed by processor 1102 for controlling an autonomous vehicle based on high-resolution depth maps. Instructions 1106 may be executed by processor 1102 to receive two-dimensional (2D) images of scenes using a set of multi-resolution cameras. In one example, the set of multi-resolution cameras may include a central camera having a first resolution, and multiple cameras having one or more resolutions that are lower than the first resolution and disposed around the central camera;

Instructions 1108 may be executed by processor 1102 to generate a low-resolution depth map for each scene using the captured 2D images of the set of multi-resolution cameras using relatively small depths. In one example, instructions 11108 to generate a low-resolution depth map may include instructions to downscale the resolution of the received 2D image of the central camera to be substantially equal to the one of one or more resolutions associated with the cameras of the multiple camera groups and generate the low-resolution depth map for each scene using all pixels in the downscaled received 2D image of the central camera, the received 2D images associated with the multiple camera groups using relatively small depths by performing a parallax warping and computing corresponding variances on neighboring pixels of each pixel and obtaining a global minimum depth value for every pixel as pixel depths.

Further, instructions 1110 may be executed by processor 1102 to generate a high-resolution depth map for each scene for a wide depth range by iteratively refining the low-resolution depth map for each scene. In one example, instructions 1110 may include instructions to refine the generated low-resolution depth map for each scene by using, for every pixel, obtained global minimum depth values as pixel depths, and further computing updated global minimum depth values using current depth values and additional new depth values around current depth values, and replacing old global minimum depth values with the updated global minimum depth values, which creates a number of new depths in the updated refined depth map, wherein the generated low-resolution depth maps is iteratively refined using the replaced updated global minimum depth values. Further, the instructions may include instructions to upscale the resolution of the received 2D images of the multiple camera groups to be substantially equal to the resolution of the received 2D image of the central camera. Further, the instructions may include instructions to generate the high-resolution depth map for each scene by performing the parallax warping and computing corresponding variances on neighboring pixels of each pixel in the received 2D image of the central camera, the upscaled received 2D images of the multiple camera groups, and the iteratively refined generated low-resolution depth map. Furthermore, the instructions may include instructions to refine the generated high-resolution depth map for each scene by using, for every pixel, obtained global minimum depth values as pixel depths, and further computing updated global minimum depth values using current depth values and additional new depth values around current depth values, and replacing old global minimum depth values with the updated global minimum depth values, which creates a number of new depths in the updated refined depth map, wherein the generated high-resolution depth map for each scene is iteratively refined using the replaced updated global minimum depth values.

Instructions 1112 may be executed by processor 1102 to generate a three-dimensional (3D) video based on the high-resolution depth maps and the captured 2D images of the central camera. Further, instructions 1114 may be executed by processor 1102 to compute a distance, a velocity, and/or an acceleration of one or more objects relative to the autonomous vehicle by analyzing one or more frames of the high-resolution 3D video, wherein each frame of the 3D video comprises the 2D image of the central camera and the corresponding high-resolution depth map. In one example, instructions 1114 to compute a distance, a velocity, and/or an acceleration of one or more objects may include instructions to convert 3D image data associated with each frame into a point cloud to identify dimensions of the one or more objects and compute the distance, velocity, and/or acceleration of one or more objects based on the identified dimensions.

Furthermore, instructions 1116 and 1118 may be executed by processor 1102 to control the autonomous vehicle based on the computed distance, velocity, and/or acceleration of the one or more objects. In one example, instructions 1116 and 1118 may include instructions to compute segmentation, path prediction, and localization of the one or more objects based on the distance, velocity, and/or acceleration of one or more objects and control the autonomous vehicle based on the computed segmentation, path prediction, and localization of the one or more objects.

The above-described examples of the present solution are for the purpose of illustration. Although the solution has been described in conjunction with an example implementation thereof, numerous modifications may be possible without materially departing from the teachings of the subject matter described herein. Other substitutions, modifications, and changes may be made without departing from the spirit of the present solution. Also, the features disclosed in this specification (including any accompanying claims, abstract, and drawings), and/or any method or process so disclosed, may be combined in any combination, except combinations where at least some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
    disposing a set of multi-resolution cameras on at least one side of an autonomous vehicle, wherein the set of multi-resolution cameras comprises a first central camera having a first resolution, and multiple first cameras having one or more resolutions that are lower than the first resolution and disposed around the first central camera, and wherein the set of multi-resolution cameras comprise multi-spectral cameras with multiple field of views, and wherein the multiple first cameras are disposed around the first central camera in multiple camera clusters, each camera cluster having:
    a second central camera; and
    multiple second cameras, having one or more resolutions that are different from a resolution of the second central camera and disposed around the second central camera, wherein the second central camera has a higher resolution than the one or more resolutions of the multiple second cameras;

capturing two-dimensional (2D) images of scenes using the first central camera and the multiple first cameras of the set of multi-resolution cameras;

generating a low-resolution depth map for each scene of the scenes using the captured 2D images using given depths;

generating a high-resolution depth map for each scene of the scenes for a wide depth range by iteratively refining the low-resolution depth map for each scene;

generating a three-dimensional (3D) video based on the high-resolution depth map corresponding to each scene of the scenes and the captured 2D images of the first central camera; and sending the 3D video to a central processing and control unit in the autonomous vehicle, wherein the central processing and control unit includes an artificial intelligence unit that utilizes an artificial intelligence to:

compute a distance, a velocity, and an acceleration of one or more objects relative to the autonomous vehicle by analyzing multiple frames of the 3D video, wherein analyzing the multiple frames of the 3D video comprises analyzing each flame of the multiple frames that includes a 2D image of the captured 2D images of the first central camera and a corresponding high-resolution depth map associated with the 2D image; and control the autonomous vehicle based on the computed distance, velocity, and acceleration of the one or more objects.

2. The method of claim 1, Wherein computing the distance, velocity, and acceleration of the one or more objects comprises:

converting, by the central processing and control unit, 3D image data associated with each frame of the multiple frames of the 3D video into a point cloud to identify dimensions of the one or more objects; and computing, by the central processing and control unit, the distance, velocity, and acceleration of the one or more objects relative to the autonomous vehicle based on the identified dimensions and the multiple frames of the 3D video.

3. The method of claim 1, wherein controlling the autonomous vehicle based on the computed distance, velocity, and acceleration of the one or more objects comprises:

computing, by the central processing and control unit, segmentation, path prediction, and localization of the one or more objects based on the distance, velocity, and acceleration of the one or more objects; and controlling, by the central processing and control unit, the autonomous vehicle based on the computed segmentation, path prediction, and localization of the one or more objects.

4. The method of claim 1, wherein each camera of the set of multi-resolution cameras having a different field of view.

5. The method of claim 1, wherein generating the low-resolution depth map for each scene comprises:

downscaling a resolution of the captured 2D images of the first central camera to be equal to one of the one or more resolutions associated with the multiple first cameras; and generating the low-resolution depth map for each scene using the downscaled 2D images of the first central camera and the captured 2D images associated with the multiple first cameras using the given depths by applying a first parallax shifting operation.

6. The method of claim 5, wherein generating the high-resolution depth map for each scene comprises:

refining the generated low-resolution depth map by increasing a number of depths by locally performing depth map refinements and iteratively performing the depth map refinements;

upscaling a resolution of the captured 2D images of the multiple first cameras to be equal. to a resolution of the captured 2D images of the first central camera; and upon upscaling the resolution of the captured 2D images, generating the high-resolution depth map corresponding to each scene using the captured 2D images of the first central camera, the upscaled 2D images of the multiple first cameras, and the refined low-resolution depth map by applying a second parallax shifting operation; and upon generating the high-resolution depth map corresponding to each scene, refining the high-resolution depth map corresponding to each scene by increasing a number of depths by locally performing the depth map refinements and iteratively performing the depth map refinements.

7. The method of claim 1, wherein the multiple second cameras are radially positioned around the first central camera in one or more directions.

8. The method of claim 1, wherein the 2D images comprise red green blue (RGB) images, monochrome images, infrared (IR) images, or any combination thereof.

9. The method of claim 1. wherein the set of multi-resolution cameras comprises monochrome cameras, colored cameras, IR cameras, monochrome with IR filter removed cameras, Bayer pattern cameras, monochrome with special filters blocking selected frequencies or combinations thereof.

10. The method of claim 1, wherein disposing the set of multi-resolution cameras comprises placing the set of multi-resolution cameras on a low thermal expansion base.

11. The method of claim 1, wherein the set of multi-resolution cameras comprises narrower field of view cameras and wider field of view cameras, wherein the narrower field of view cameras are to capture 2D images at longer distances, and wherein the wider field of view cameras are to capture 2D images at medium of short distances.

12. The method of claim 1, further comprising: calibrating the set of multi-resolution cameras prior to disposing the set of multi-resolution cameras on the autonomous vehicle.

13. The method of claim 12, further comprising:

computing an other high-resolution depth map for each scene using different subsets of multi-resolution cameras in the set of multi-resolution cameras, wherein the different subsets of multi-resolution cameras are part of the multiple camera clusters;

detecting a deviation in the other high-resolution depth map for each scene associated with one or more cameras of the set of multi-resolution cameras by comparing depth maps associated with the different subsets of multi-resolution cameras; and dynamically recalibrating the one or more cameras by adjusting a calibration parameter based on the detected deviation.

14. The method of claim 1, further comprising:

dynamically measuring a temperature surrounding the autonomous vehicle using a temperature sensor;

selecting one of multiple predetermined calibration tables corresponding to the measured temperature; and dynamically calibrating the set of multi-resolution cameras using the selected predetermined calibration table.

15. An autonomous vehicle comprising:
a set of multi-resolution cameras disposed on at least one side of the autonomous vehicle, Wherein the set of multi-resolution cameras comprises a first central camera having a first resolution, and multiple first cameras having one or more resolutions that are lower than the first resolution and disposed around the first central camera, and wherein the set of multi-resolution cameras comprise multi-spectral cameras with multiple field of views, and wherein the multiple first cameras are disposed around the first central camera in multiple camera clusters, each camera cluster having:
  a second central camera; and
  multiple second cameras, having one or more resolutions that are different from a. resolution of the second central camera and disposed around the second central camera, wherein the second central camera has a higher resolution than the one or more resolutions of the multiple second cameras;
at least one processor communicatively coupled to the set of multi-resolution cameras; and
memory coupled to the processor, wherein the memory comprises an image processing unit and a central processing and control unit, wherein the image processing unit, when executed by the at least one processor, is to:
  receive two-dimensional (2D) images of scenes using the first central camera and the multiple first cameras of the set of Multi-resolution :cameras;
  generate a low-resolution depth map for each scene of the scenes using the received 2D images using given depths;
  generate a high-resolution depth map for each scene of the scenes for a wide depth range by iteratively refining the low-resolution depth map for each scene;
  generate a three-dimensional (3D) video based on the high-resolution depth map corresponding to each scene of the scenes and the received 2D images of the first central camera; and
  send the 3D video to the central processing and control unit in the autonomous vehicle, wherein the central processing and control unit is to utilize includes an artificial intelligence unit that utilizes an artificial intelligence to:
    compute a distance, a velocity, and an acceleration of one or more objects. relative to the autonomous vehicle by analyzing multiple frames of the 3D video, wherein analyzing the multiple frames of the 3D video comprises analyzing each frame of the multiple frames that includes a 2D image of the received 2D images of the first central camera and a corresponding 1Ugh-resolution depth map associated with the 2D image; and
    control the autonomous vehicle based on the computed distance, velocity and acceleration of the one or more objects.

16. The autonomous vehicle of claim 15, wherein the central processing and control unit, when executed by the at least one processor, is to:
convert 3D image data associated with each frame of the multiple frames of the 3D video into a point cloud to identify dimensions of the one or more objects; and
compute the distance, velocity, and acceleration of the one or more objects relative to the autonomous vehicle based on the identified dimensions and the multiple frames of the 3D video.

17. The autonomous vehicle of claim 15, wherein the central processing and control unit, when executed by the at least one processor, is to:
Compute segmentation, path prediction, and localization of the one or more objects based on the distance, velocity, and acceleration of the one or more objects; and
control the autonomous vehicle based on the computed segmentation, path prediction, and localization of the one or more objects.

18. The autonomous vehicle of claim 15, wherein each camera of the set of resolution cameras having a different field of view.

19. The autonomous vehicle of claim 15, wherein the image processing unit, when executed by the at least one processor, is configured to:
downscale a resolution of the received 2D images of the first central camera to be equal to one of the one or more resolutions associated with the muiltiple first cameras; and
generate the low-resolution depth map for each scene using the downscaled 2D images of the first central camera and the received 2D images associated with the multiple first cameras using the given depths by applying a first parallax shifting operation.

20. The autonomous vehicle of claim 19, wherein the image processing unit, when executed by the at least one processor. is further configured to:
refine the generated low-resolution depth map by increasing a number of depths by locally performing depth map refinements and iteratively performing the depth map refinements;
upscale a resolution of the received 2D images of the multiple first cameras to be equal to a resolution of the received 2D images of the first central camera.; and
upon upscaling the resolution of the received 2D images, generate the high-resolution depth map corresponding to each scene using the images received 2D of the first central camera, the upscaled 2D images of the multiple first cameras, and the refined low-resolution depth map by applying a second parallax shifting operation; and
upon generating the high-resolution depth map corresponding to each scene, refining the high-resolution depth map corresponding to each scene by increasing a number of depths by locally performing the depth map refinements and iteratively performing the depth map refinements.

21. The autonomous vehicle of claim 15, wherein the multiple first cameras are radially positioned around the first central camera in one or more directions.

22. The autonomous vehicle of claim 15, wherein the 2D images comprise red green blue (RGB) images, monochrome images, infrared (IR) images, or any combination thereof.

23. The autonomous vehicle of claim 15, wherein the set of multi-resolution cameras comprises monochrome cameras, colored cameras, IR cameras, monochrome with IR filter removed cameras, Bayer patteni cameras, monochrome with special filters blocking selected frequencies, or combinations thereof.

24. The autonomous vehicle of claim 15, wherein the set of multi-resolution cameras. is disposed on a. low thermal expansion base.

25. The autonomous vehicle of claim 15, wherein the set of multi-resolution cameras comprises narrower field of view cameras and wider field of view cameras, wherein the narrower field of view cameras are to capture 2D images at longer distances, and wherein the wider field of view cameras are to capture 2D images at medium or short distances.

26. The autonomous vehicle of claim 15, wherein the image processing unit, when executed by the at least one processor, is configured to:
calibrate the set of multi-resolution cameras prior to disposing the set of multi-resolution cameras on the autonomous vehicle.

27. The autonomous vehicle of claim 26, wherein the image processing unit, when executed by the at least one processor, is configured to:
compute an other high-resolution depth map for each scene of the scenes using different subsets of multi-resolution cameras in the set of multi-resolution cameras, wherein the different subsets of multi-resolution cameras are part of the multiple camera clusters;
detect a deviation in the other high-resolution depth map for each scene associated with one or more cameras of the set of multi-resolution cameras by comparing computed high-resolution depth maps of the scenes associated with the different subsets of multi-resolution cameras; and
dynamically recalibrate the one of more cameras by adjusting a calibration parameter based oil the detected deviation.

28. The autonomous vehicle of claim 15, wherein the image processing unit, when executed by the at least one processor, is configured to:
dynamically measure a temperature surrounding the autonomous vehicle using a temperature sensor; and
select one of multiple predetermined calibration tables corresponding to the measured temperature, which can be utilized by the image processing unit to generate the high-resolution depth maps.

29. A non-transitory machine-readable storage medium encoded with instructions that, when executed by a processor of a container host, cause the processor to:
receive two-dimensional (2D) images of scenes using a first central camera and multiple first cameras of a set of multi-resolution cameras, wherein the set of multi-resolution cameras comprises the first central camera having a first resolution, and the multiple first cameras having one or more resolutions that are lower than the first resolution and disposed around the first central camera, and wherein the set of multi-resolution cameras comprise multi-spectral cameras with multiple field of views, and wherein the multiple first cameras are disposed around the first central camera in multiple camera cluster, each camera cluster having:
a second central camera; and
multiple second cameras, having one or More resolutions that are different from a resolution of the second central camera and disposed around the second central camera, wherein the second central camera has a higher resolution than the one or more resolutions of the multiple second cameras;
generate a. low-resolution depth map for each scene of the scenes using the received 2D images using given depths;
generate a high-resolution depth map for each scene of the scenes for a wide depth range by iteratively refining the low-resolution depth map for each scene;
generate a three-dimensional (3D) video based on the high-resolution depth map corresponding to each scene of the scenes and the received 2D images of the first central camera; and
send the 3D video to a central processing and control unit of the autonomous vehicle, wherein the central processing and control unit includes an artificial intelligence unit that utilizes an artificial intelligence to:
compute a distance a velocity, and an acceleration of one or more objects relative to the autonomous vehicle by analyzing multiple frames of the 3D video, wherein analyzing the multiple frames of the 3D video comprises analyzing each frame of the multiple frames that includes a 2D image of the received 2D images of the first central camera and a corresponding high-resolution depth map associated with the 2D image; and
control the autonomous vehicle based on the computed distance, velocity, and acceleration of the one or more objects.

30. The non-transitory machine-readable storage medium of claim 29, wherein the instructions to compute the distance, velocity, and acceleration of the one or more objects comprise instructions to:
convert, by the central processing and control unit, 3D image data associated with each frame of the multiple frames of the 3D video into a point cloud to identify dimensions of the one or more objects; and
compute, by the central processing and control unit, the distance, velocity, and acceleration of the one or more objects relative to the autonomous vehicle based on the identified dimensions and the multiple frames of the 3D video.

31. The non-transitory machine-readable storage medium of claim 29, wherein the instructions to control the autonomous vehicle comprise instructions to:
compute, by the central processing and control unit, segmentation, path prediction, and localization of the one or more objects based on the distance, velocity, and acceleration of the one or more objects; and
control, by the central processing and control unit, the autonomous vehicle based on the computed segmentation path prediction, and localization of the one or more objects.

32. The non-transitory machine-readable storage medium of claim 31, wherein the instructions to generate a low-resolution depth map comprise instructions to:
downscale the resolution of the received 2D image of the central camera to be substantially equal to the one of one or more resolutions associated with the cameras of the multiple camera groups; and
generate the low-resolution depth map for each scene using all pixels in the downscaled received 2D image of the central camera, the received 2D images associated with the multiple camera groups using relatively small depths by performing a parallax warping and computing corresponding variances on neighboring pixels of each pixel and obtaining a global minimum depth value for every pixel as pixel depths.

33. The non-transitory machine-readable storage medium of claim 32, wherein the instructions to generate the high-resolution depth map comprise instructions to:
refine the generated low-resolution depth map for each scene by using, for every pixel, obtained global minimum depth values as pixel depths, and further computing updated global minimum depth values using current depth values and additional new depth values around current depth values, and replacing old global minimum depth values with the updated global minimum depth values, which creates a number of new depths in the updated refined depth map, wherein the generated low-resolution depth maps is iteratively refined using the replaced updated global minimum depth values;

upscale the resolution of the received 2D images of the multiple camera groups to be substantially equal to the resolution of the received 2D image at the central camera;

generate the high-resolution depth map fer each scene by performing the parallax warping and computing corresponding variances on neighboring pixels of each pixel in the received 2D image of the central camera, the upscaled received 2D images of the multiple camera groups, and the iteratively refined generated low-resolution depth map; and refine the generated high-resolution depth map for each scene by using, for every pixel, obtained global minimum depth values as pixel depths, and further computing updated global minimum depth values using current depth values and additional new depth values around current depth values, and replacing old global minimum depth values with the updated global minimum depth values, which creates a number at new depths in the updated refined depth map, wherein the generated high-resolution depth map fer each scene is iteratively refined using the replaced updated global minimum depth values.

34. The non-transitory machine-readable storage medium of claim 29, further comprising instructions that, when executed by the processor, cause the processor to:

dynamically measure a temperature surrounding the autonomous vehicle using a temperature sensor; and select true at multiple predetermined calibration tables corresponding to the measured temperature, wherein the selected predetermined calibration table is utilized to generate the high-resolution depth maps.

* * * * *